United States Patent
Kim et al.

(10) Patent No.: US 10,567,114 B2
(45) Date of Patent: Feb. 18, 2020

(54) METHOD AND APPARATUS FOR TRANSMITTING AND RECEIVING DOWNLINK CONTROL INFORMATION IN WIRELESS COMMUNICATION SYSTEM

(71) Applicant: Samsung Electronics Co., Ltd., Suwon-si, Gyeonggi-do (KR)

(72) Inventors: Taehyoung Kim, Seoul (KR); Youngbum Kim, Seoul (KR); Jeongho Yeo, Hwaseong-si (KR); Seunghoon Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/050,576

(22) Filed: Jul. 31, 2018

(65) Prior Publication Data
US 2019/0044649 A1    Feb. 7, 2019

(30) Foreign Application Priority Data
Aug. 4, 2017  (KR) .......................... 10-2017-0099030

(51) Int. Cl.
*H04L 1/00* (2006.01)
*H04L 5/00* (2006.01)
*H04W 72/04* (2009.01)

(52) U.S. Cl.
CPC .............. *H04L 1/0038* (2013.01); *H04L 1/00* (2013.01); *H04L 1/0061* (2013.01);
(Continued)

(58) Field of Classification Search
CPC ... H04L 1/0038; H04L 1/0061; H04L 5/0053; H04L 1/00; H04L 5/0044; H04L 5/0092; H04L 5/0007; H04W 72/0446; H04W 72/042; H04W 72/0453; H04W 72/0406; H04W 48/12

See application file for complete search history.

(56) References Cited

U.S. PATENT DOCUMENTS

| | | | |
|---|---|---|---|
| 2011/0110316 A1* | 5/2011 | Chen .................. | H04W 72/042 370/329 |
| 2013/0039291 A1* | 2/2013 | Blankenship ........... | H04L 5/001 370/329 |

(Continued)

OTHER PUBLICATIONS

Partial European Search Report dated Jan. 2, 2019, issued in European Application No. 18187139.3.

(Continued)

*Primary Examiner* — Jung Liu
(74) *Attorney, Agent, or Firm* — Jefferson IP Law, LLP

(57) ABSTRACT

The disclosure relates to a communication method and system for converging a 5th-generation (5G) communication system for supporting higher data rates beyond a 4th-generation (4G) system with a technology for internet of things (IoT). The disclosure may be applied to intelligent services based on the 5G communication technology and the IoT-related technology, such as smart home, smart building, smart city, smart car, connected car, health care, digital education, smart retail, security and safety services. A method and apparatus that reduce power consumption of the terminal and increase resource utilization efficiency of the base station through resource sharing between the data channel and the control channel are provided.

24 Claims, 13 Drawing Sheets

(52) U.S. Cl.
CPC .......... *H04L 5/0044* (2013.01); *H04L 5/0053* (2013.01); *H04L 5/0094* (2013.01); *H04W 72/042* (2013.01); *H04W 72/0406* (2013.01); *H04W 72/0446* (2013.01); *H04W 72/0453* (2013.01)

(56) References Cited

U.S. PATENT DOCUMENTS

| | | | | |
|---|---|---|---|---|
| 2013/0114563 | A1* | 5/2013 | Oizumi | H04L 5/001 370/329 |
| 2013/0148623 | A1* | 6/2013 | Nishio | H04L 1/004 370/329 |
| 2013/0163551 | A1* | 6/2013 | He | H04W 4/70 370/329 |
| 2015/0078273 | A1* | 3/2015 | Aiba | H04L 5/0048 370/329 |
| 2015/0139123 | A1* | 5/2015 | McBeath | H04L 5/0005 370/329 |
| 2015/0334689 | A1* | 11/2015 | Nishio | H04L 5/0007 370/329 |
| 2016/0227523 | A1* | 8/2016 | Desai | H04W 72/042 |
| 2016/0249337 | A1* | 8/2016 | Liang | H04W 72/042 |
| 2016/0353421 | A1* | 12/2016 | Liao | H04W 72/042 |
| 2017/0127388 | A1 | 5/2017 | Chen et al. | |
| 2018/0152928 | A1* | 5/2018 | Saito | H04L 5/001 |
| 2018/0317213 | A1* | 11/2018 | Islam | H04W 72/0406 |
| 2019/0182812 | A1* | 6/2019 | Shimezawa | H04L 27/26 |

OTHER PUBLICATIONS

Qualcomm Incorporated: "Resource reuse for data in DL control region", 3GPP Draft; R1-1708612 Resource Reuse for Data in DL Control Region, 3rd Generation Partnership Project (3GPP), Mobile Competence Centre ; 650, Route Des Lucioles ; F-06921 Sophia-Antipolis Cedex; FR vol. RAN WG1, No. Hangzhou, XP051273801, May 14, 2017.

Huawei et al: "Resource multiplexing of downlink control and data", 3GPP Draft; R1-1709956, 3rd Generation Partnership Project (3GPP), Mobile Competence Centre ; 650, Route Des Lucioles ; F-06921 Sophia-Antipolis Cedex ; France, vol. RAN WG1, No. Qingdao, China, XP051299181, Jun. 26, 2017.

Nokia et al: "Resource sharing between PDCCH and PDSCH in NR", 3GPP Draft; R1-1710983 Resource Sharing Between PDCCH and PDSCH Final, 3rd Generation Partnership Project (3GPP), Mobile Competence Centre; 650, Route Deslucioles; F-06921 Sophia-Antipolis Cedex, vol. RAN WG1, No. Qingdao, China, XP051300183, Jun. 26, 2017.

NTT Docomo et al: "Resource sharing between data and control channels", 3GPP Draft; R1-1711093, 3rd Generation Partnership Project (3GPP), Mobile Competence Centre ; 650, Route Des Lucioles ; F-06921 Sophia-Antipolis Cedex; France, vol. RAN WG1, No. Qingdao, P.R. China; XP051300293, Jun. 26, 2017.

Extended European Search Report dated May 7, 2019, issued in a counterpart European Application No. 18187139.3-1219 / 3439222.

NTT Docomo et al: "Dynamic resource sharing between DL data and control channels", 3GPP Draft; R1-1702834, 3rd Generation Partnership Project (3GPP), Mobile Competence Centre ; 650, Route Des Lucioles; F-06921 Sophia-Antipolis Cedex ; France, vol. RAN WG1, No. XP051209979; Feb. 2, 2017; Athens, Greece.

Ericsson: "On Data Transmission in Control Resource Sets", 3GPP Draft; R1-1711482, 3rd Generation Partnership Project (3GPP), Mobile Competence Centre; 650, Route Des Lucioles; F-06921 Sophia-Antipolis Cedex; France, vol. RAN WG1, No. XP051300667; Jun. 26, 2017; Qingdao, P.R. China.

\* cited by examiner

METHOD AND APPARATUS FOR TRANSMITTING AND RECEIVING DOWNLINK CONTROL INFORMATION IN WIRELESS COMMUNICATION SYSTEM

CROSS-REFERENCE TO RELATED APPLICATION(S)

This application is based on and claims priority under 35 U.S.C. § 119 of a Korean patent application number 10-2017-0099030, filed on Aug. 4, 2017, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for transmitting and receiving downlink control information (DCI).

2. Description of the Related Art

To meet the demand for wireless data traffic, which has increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

Meanwhile, there are various discussions on the schemes for increasing the efficiency of resources in the next generation communication system. In particular, there is an increasing demand for utilizing the resource region through which the control channel is transmitted in a flexible way.

The above information is presented as background information only to assist with an understanding of the disclosure. No determination has been made, and no assertion is made, as to whether any of the above might be applicable as prior art with regard to the disclosure.

SUMMARY

Downlink control signaling is required to support transmission of downlink and uplink transmission channels in a wireless communication system. Control signaling in the existing 4th generation (4G) long term evolution (LTE) system may include information, such as a downlink scheduling assignment indicating information necessary for the terminal to properly receive, demodulate and decode the physical downlink shared channel (PDSCH), an uplink scheduling grant indicating the resource and transmission format used by the terminal for the physical uplink shared channel (PUSCH), and a hybrid automatic repeat request (HARQ) acknowledgment for the PUSCH. In LTE, there is a physical downlink control channel (PDCCH) as a physical layer transmission channel for transmitting the downlink scheduling assignment and uplink scheduling grant, and the PDCCH is transmitted over the entire band at the beginning of each subframe. That is, the subframe can be divided into a control region and a data region, and the size of the control region is designed to occupy one, two, or three orthogonal frequency division multiplexing (OFDM) symbols. The size of the control region represented by the number of OFDM symbols can be changed dynamically according to special circumstances such as configuration of the size of the system bandwidth and configuration of a multimedia broadcast multicast services (MBSFN) subframe for broadcasting, and this can be notified to each terminal through a control format indicator (CFI).

Meanwhile, unlike existing communication systems, the 5th generation (5G) wireless communication system is intended to support not only services requiring high data rates but also services having very short transmission latency and services requiring high connection density. In these scenarios, it is necessary to provide various services involving different transmission and reception techniques and parameters in one system for satisfying diverse requirements and needs of users, and it is important to design the system for forward compatibility so that the services to be added are not constrained by the current system. For example, various services using scalable numerologies for the subcarrier spacing and different transmission time intervals (TTIs) can be simultaneously served by a single system. Consequently, the 5G system should be able to utilize time and frequency resources more flexibly than the existing LTE system.

The PDCCH used in the current LTE system may be not suitable for ensuring flexibility because it is transmitted over the entire bandwidth and the size of the control region is cell-specific. In the 5G wireless communication system, a structure in which the control channel can be flexibly allocated according to various requirements of services is being considered. For example, the control resource set (CORESET) defined as a control region in the time and frequency domain in which a 5G downlink control channel is transmitted can be configured over a specific subband in the frequency domain without being transmitted over the entire frequency band, and can be configured to have a different number of OFDM symbols (different sizes) in the time domain. A plurality of control regions may exist in one system, and a plurality of control regions may be configured for one terminal. Hence, it is possible to efficiently manage the control region according to whether the downlink control signal is transmitted, thereby flexibly supporting various services.

Aspects of the disclosure are to address at least the above-mentioned problems and/or disadvantages and to provide at least the advantages described below. Accordingly, an aspect of the disclosure is to provide an apparatus and method for detecting first downlink control information (DCI) indicating downlink scheduling in the whole of a search space of the terminal, determining whether data associated with the first DCI is mapped to a resource region used for transmission of control information; and detecting second DCI in the search space of the terminal depending upon whether the data is mapped to the resource region used for transmission of the control information.

Additional aspects will be set forth in part in the description which follows and, in part, will be apparent from the description, or may be learned by practice of the presented embodiments.

In accordance with an aspect of the disclosure, a method for a terminal in a wireless communication system is provided. The method includes detecting a first downlink control information (DCI) indicating downlink scheduling in the whole of a search space of the terminal, determining whether data associated with the first DCI is mapped to a resource region used for transmission of control information, and detecting a second DCI in the search space of the terminal depending upon whether the data is mapped to the resource region used for transmission of the control information.

In accordance with another aspect of the disclosure, a terminal in a wireless communication system is provided. The terminal includes a transceiver configured to transmit and receive a signal and a controller configured to detect a first DCI indicating downlink scheduling in the whole of a search space of the terminal, determine whether data associated with the first DCI is mapped to a resource region used for transmission of control information, and detect a second DCI in the search space of the terminal depending upon whether the data is mapped to the resource region used for transmission of the control information.

In accordance with another aspect of the disclosure, a method for a base station in a wireless communication system is provided. The method includes determining whether a first resource region mapped with data to be transmitted to a terminal overlaps with a second resource region used for transmission of control information, determining whether to transmit the data by mapping the data to the second resource region based on a ratio of overlap between the first resource region and the second resource region, and transmitting the data to the terminal via the resource region mapped with the data.

In accordance with another aspect of the disclosure, a base station in a wireless communication system is provided. The base station includes a transceiver configured to transmit and receive a signal and a controller configured to determine whether a first resource region mapped with data to be transmitted to a terminal overlaps with a second resource region used for transmission of control information, determine whether to transmit the data by mapping the data to the second resource region based on a ratio of overlap between the first resource region and the second resource region, and transmit the data to the terminal via the resource region mapped with the data.

In a feature of the disclosure, there is provided a method for transmitting a data channel and (DCI) that enables efficient reuse of the control region in a wireless communication system. In addition, there is provided a low power monitoring scheme for the downlink control channel, thereby greatly reducing the number of blind decodings of the downlink control channel. Hence, it is possible to realize an energy efficient terminal through reduction of power consumption.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
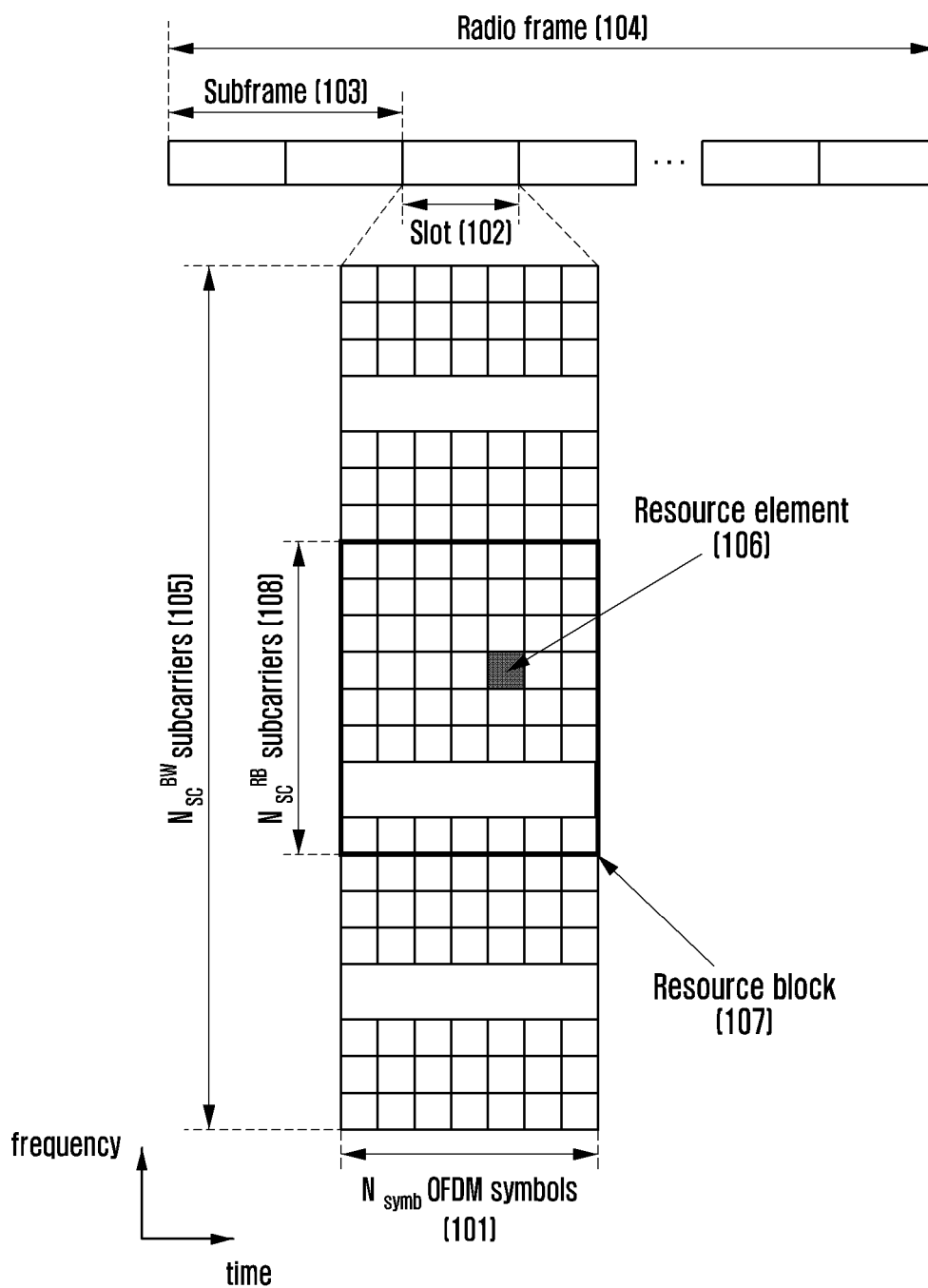
FIG. 1 illustrates a basic structure of a time-frequency domain in long term evolution (LTE) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Descriptions of functions and structures well known in the art and not directly related to the disclosure may be omitted for clarity and conciseness without obscuring the subject matter of the disclosure.

In the drawings, some elements are exaggerated, omitted, or only outlined in brief, and thus may be not drawn to scale. The same or similar reference symbols are used throughout the drawings to refer to the same or like parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out operations of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as a field-programmable gate array (FPGA) or application-specific integrated circuit (ASIC) capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

In contrast to early wireless communication systems having provided voice-oriented services only, advanced broadband wireless communication systems, such as 3rd generation partnership project (3GPP) high speed packet access (HSPA) systems, long term evolution (LTE) or evolved universal terrestrial radio access (E-UTRA) systems, LTE-advanced (LTE-A) systems, LTE Pro systems, 3GPP2 high rate packet data (HRPD) systems, ultra mobile broadband (UMB) systems, and institute of electrical and electronics engineers (IEEE) 802.16e based systems, may provide high-speed and high-quality packet data services.

In the LTE system as a representative example of a wideband wireless communication system, orthogonal frequency division multiplexing (OFDM) is used for the downlink (DL) and single carrier frequency division multiple access (SC-FDMA) is used for the uplink (UL). The UL refers to a radio link through which a terminal (user equipment (UE) or mobile station (MS)) sends a data or control signal to a base station (BS or eNode B), and the downlink refers to a radio link through which the base station sends data or a control signal to the terminal. In such multiple access schemes, time-frequency resources used to carry user data or control information are allocated so as not to overlap each other (i.e. maintain orthogonality) to thereby identify the data or control information of a specific user.

As a post-LTE communication system, the 5th generation (5G) communication system should be able to support services satisfying various requirements in consideration of various requirements of users and service providers. The 5G communication system aims to support use cases such as enhanced mobile broadband (eMBB), massive machine type communication (mMTC), and ultra reliable and low latency communications (URLLC).

eMBB seeks to provide a higher data rate than that supported by the existing LTE, LTE-A or LTE-Pro system. For example, for eMBB in the 5G communication system, the base station should be able to provide a peak data rate of 20 Gbps in the downlink and a peak data rate of 10 Gbps in the uplink. At the same time, the 5G communication system should provide an increased user perceived data rate for the terminal. Satisfying these requirements requires improvements in various transmission and reception techniques including improved multiple-input and multiple-output (MIMO) technology. While the current LTE system transmits signals using a maximum transmission bandwidth of 20 MHz in the 2 GHz band, the 5G communication system may meet the required data transmission rate by using a transmission bandwidth greater than 20 MHz in the bands of frequencies between 3 and 6 GHz or 6 GHz and higher.

At the same time, in the 5G communication system, mMTC is considered to support application services such as the internet of things (IoT). For efficient support of IoT services, mMTC is required to support a massive number of terminals in a cell, extend the coverage for the terminal, lengthen the battery time for the terminal, and reduce the cost of the terminal. The Internet of Things must be able to support a massive number of terminals (e.g., 1,000,000 terminals/km$^2$) in a cell to provide a communication service to sensors and components attached to various devices. In addition, due to the nature of the service, mMTC is more likely to cover shadow areas such as the basement of a building and a region that a cell cannot cover, thus requiring a coverage wider than that provided by other 5G services. Low-cost terminals are likely to be used in mMTC, and a very long battery lifetime (e.g., 10 to 15 years) is required because it is difficult to frequently replace the battery of a terminal.

URLLC, as cellular-based mission-critical wireless communication for a specific purpose, is a service usable for remote control of robots or machinery, industrial automation, unmanned aerial vehicles, remote health care, and emergency notification, and should enable ultra-reliable and low-latency communication. For example, a URLLC service may have to support both an air interface latency of less than 0.5 ms and a packet error rate of $10^{-5}$ or less as a requirement. Hence, for the URLLC, the transmission time interval (TTI) should be shorter than that of other 5G services, and resources should be allocated in a wide frequency band for the reliability of communication links.

The three 5G services (i.e., eMBB, URLLC, and mMTC) can be multiplexed and transmitted in one system. To satisfy different requirements, different transmission and reception techniques and parameters can be used for the 5G services.

Next, a description is given of the frame structure of the LTE or LTE-A system with reference to the drawings.

FIG. 1 illustrates a basic structure of a time-frequency domain serving as radio resources to transmit data or control channels in a downlink of an LTE system according to an embodiment of the disclosure.

Referring to FIG. 1, the horizontal axis denotes the time domain and the vertical axis denotes the frequency domain. In the time domain, the minimum unit for transmission is OFDM symbols, $N_{symb}$ OFDM symbols 101 constitute one slot 102, and two slots constitute one subframe 103. The length of a slot is 0.5 ms and the length of a subframe is 1.0 ms. The radio frame (or frame) 104 is a time domain unit composed of 10 subframes. In the frequency domain, the minimum unit for transmission is subcarriers, and the total system transmission bandwidth is composed of total $N_{BW}$ subcarriers 105. The basic unit of resources in the time-frequency domain is a resource element (RE) 106. The RE may be represented by an OFDM symbol index and a subcarrier index. A resource block (RB, or physical resource block (PRB)) 107 is defined by $N_{symb}$ consecutive OFDM symbols 101 in the time domain and $N_{RB}$ consecutive subcarriers 108 in the frequency domain. Hence, one RB 107 is composed of $N_{symb} \times N_{RB}$ REs 106. In general, the minimum unit for data transmission is a RB. Normally, in the LTE system, $N_{symb}$ is set to 7 and $N_{RB}$ is set to 12, and $N_{BW}$ and $N_{RB}$ are proportional to the bandwidth of the system transmission band.

Next, a description is given of the downlink control information (DCI) in the LTE or LTE-A system.

In the LTE system, scheduling information for downlink data or uplink data is sent by the base station to the terminal through DCI. Various DCI formats are defined. The DCI format to be used may be determined according to various parameters related to scheduling information for uplink data, scheduling information for downlink data, compact DCI with a small size, spatial multiplexing using multiple antennas, and power control DCI. For example, DCI format 1 for scheduling information of downlink data is configured to include at least the following pieces of control information.

Resource allocation type 0/1 flag: this indicates whether the resource allocation scheme is of type 0 or type 1. Type 0 indicates resource allocation in units of resource block groups (RBG) by use of a bitmap. In the LTE system, the basic scheduling unit is a RB represented as a time-frequency domain resource. An RBG including multiple RBs is the basic scheduling unit for type 0. Type 1 indicates allocation of a specific RB in one RBG.

Resource block assignment: this indicates an RB allocated for data transmission. The resource represented by RB assignment is determined according to the system bandwidth and resource allocation scheme.

Modulation and coding scheme (MCS): this indicates the modulation scheme applied for data transmission and the transport block (TB) size for data to be sent.

Hybrid automatic repeat request (HARQ) process number: this indicates the process number of the corresponding HARQ process.

New data indicator: this indicates either initial transmission or retransmission for HARQ.

Redundancy version: this indicates the redundancy version for HARQ.

Transmit power control (TPC) command for physical uplink control channel (PUCCH): this indicates a TPC command for the PUCCH serving as an uplink control channel.

As described above, the DCI transmitted through the downlink control channel includes the following information.

Downlink scheduling assignment: physical downlink shared channel (PDSCH) resource assignment, transmission format, HARQ information, spatial multiplexing control information Uplink scheduling grant: physical uplink shared channel (PUSCH) resource assignment, transmission format, HARQ information, PUSCH power control Power control command for terminal set Different pieces of control information typically have different DCI message sizes, which are classified into different DCI formats. As a brief introduction to the DCI format, the downlink scheduling assignment information is transmitted in DCI format 1/1A/2/1C/1D/2/2A/2B/2C, the uplink scheduling grant is transmitted in DCI format 0/4, and the power control command is transmitted in DCI format 3/3A. In general, since multiple terminals are simultaneously scheduled in the downlink and uplink, a plurality of DCI transmissions occur simultaneously.

The DCI is channel coded, modulated, and sent through the physical downlink control channel (PDCCH) or enhanced PDCCH (EPDCCH).

A cyclic redundancy check (CRC) is attached to the DCI message payload, and the CRC is scrambled with a radio network temporary identifier (RNTI) corresponding to the identity of a terminal. Different RNTIs are used depending on the purpose of the DCI message, e.g., terminal-specific data transmission, power control command, or random access response. That is, the RNTI is not explicitly transmitted but is included in the CRC calculation for transmission. Upon receiving a DCI message transmitted on the PDCCH, the terminal uses the allocated RNTI to check the CRC. If the CRC check is successful, the terminal is aware that the DCI message is transmitted to it.

Next, a description is given of the downlink control channel in the LTE or LTE-A system with reference to the drawings.

Figure 2:
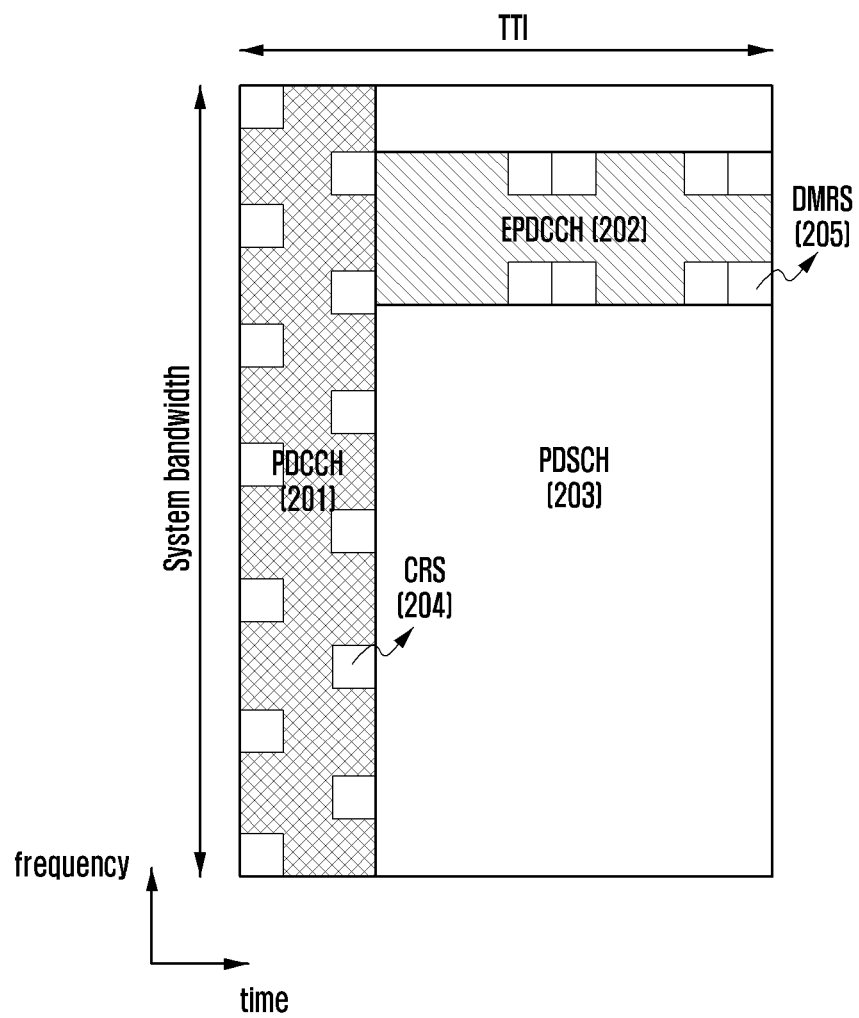
FIG. 2 illustrates a physical downlink control channel (PDCCH) and an enhanced PDCCH (EPDCCH) serving as a downlink control channel in LTE according to an embodiment of the disclosure.

FIG. 2 shows a PDCCH and an EPDCCH serving as downlink physical channels through which a DCI is transmitted in LTE according to an embodiment of the disclosure.

Referring to FIG. 2, a PDCCH 201 is time-multiplexed with a PDSCH 203 serving as a data transmission channel and is transmitted over the entire system bandwidth. The region of the PDCCH 201 is represented by the number of OFDM symbols, and the number of OFDM symbols is notified to the terminal via a control format indicator (CFI) transmitted through the physical control format indicator channel (PCFICH). The PDCCH 201 is allocated to the first OFDM symbols of the subframe so that the terminal can decode the downlink scheduling assignment as soon as possible. This can reduce the decoding delay for the downlink shared channel (DL-SCH), i.e., the overall downlink transmission delay. Since one PDCCH carries one DCI message and a plurality of terminals can be scheduled simultaneously in the downlink and uplink, plural PDCCHs are simultaneously transmitted in each cell.

The CRS 204 is used as a reference signal for decoding the PDCCH 201. The CRS 204 is transmitted every subframe over the entire bandwidth, and scrambling and resource mapping are changed according to the cell identity (ID). Since the CRS 204 is a reference signal common to all terminals, terminal-specific beamforming cannot be used. Thus, in LTE, multiple antenna transmission for the PDCCH is limited to open loop transmit diversity. The number of CRS ports is implicitly known to the terminal from the decoding of the physical broadcast channel (PBCH).

The resource allocation for the PDCCH 201 is based on a control channel element (CCE), and one CCE is composed of 9 resource element groups (REGs) (i.e., 36 REs). The number of CCEs required for a particular PDCCH 201 may be 1, 2, 4, or 8 depending on the channel coding rate of the DCI message payload. As such, different numbers of CCEs are used to implement the link adaptation of the PDCCH 201.

The terminal should detect a signal in a state where it does not know information about the PDCCH 201. In this regard, a search space indicating a set of CCEs for blind decoding is specified in LTE. The search space is composed of a set of CCEs for each aggregation level (AL), and is not explicitly signaled but implicitly specified by a function of the terminal identity and the subframe number. The terminal performs decoding of the PDCCH 201 for all possible resource candidates that can be generated from the CCEs in the search space set in each subframe, and processes the information found to be valid to the terminal through the CRC check.

The search space is classified into a terminal-specific search space and a common search space. Some or all terminals in a certain group can examine the common search space of the PDCCH 201 to receive control information common to the cell such as dynamic scheduling of the system information and paging messages. For example, the scheduling assignment information of the DL-SCH for transmission of system information block 1 (SIB-1) including the cell operator information can be received by checking the common search space of the PDCCH 201.

With reference to FIG. 2, an EPDCCH 202 is frequency-multiplexed with the PDSCH 203 for transmission. The base station can appropriately allocate resources for the EPDCCH 202 and the PDSCH 203 through scheduling and effectively support the coexistence with data transmissions for the existing LTE terminal. However, since the EPDCCH 202 is transmitted over one entire subframe in the time domain, there is a loss in terms of transmission delay. A plurality of EPDCCHs 202 constitute one EPDCCH set, and allocation of an EPDCCH set is performed on a PRB pair basis. The location information for the EPDCCH set is terminal-specifically configured and is signaled via RRC (radio resource control). Up to two EPDCCH sets may be configured for a terminal, and one EPDCCH set may be configured to different terminals at the same time in a multiplexed fashion.

The resource allocation of the EPDCCH 202 is based on the enhanced CCE (ECCE), one ECCE can be composed of four or eight enhanced REGs (EREGs), and the number of EREGs per ECCE depends on the CP length and the subframe configuration information. One EREG is composed of 9 REs, and there can be 16 EREGs per PRB pair. EPDCCH transmission may be localized or distributed according to the RE mapping scheme of the EREG. The ECCE AL can be 1, 2, 4, 8, 16, or 32, and is determined according to the CP length, subframe configuration, EPDCCH format, and transmission scheme.

The EPDCCH 202 supports only the terminal-specific search space. Hence, a terminal wishing to receive a system message must examine the common search space on the existing PDCCH 201.

Unlike the PDCCH 201, a demodulation reference signal (DMRS) 205 is used as a reference signal for decoding in the EPDCCH 202. Thus, precoding for the EPDCCH 202 can be configured by the base station and use terminal-specific beamforming. Through the DMRS 205, the terminals can perform decoding on the EPDCCH 202 without knowing what precoding is used. The EPDCCH 202 uses the same pattern as the DMRS of the PDSCH 203. However, unlike the PDSCH 203, the DMRS 205 in the EPDCCH 202 can support transmission using up to four antenna ports. The DMRS 205 is transmitted only in the corresponding PRB in which the EPDCCH is transmitted.

The port configuration information of the DMRS 205 depends on the transmission scheme of the EPDCCH 202. For localized transmission, the antenna port corresponding to the ECCE to which the EPDCCH 202 is mapped is selected based on the ID of the terminal. If different terminals share the same ECCE (i.e., multiuser MIMO transmission is used), the DMRS antenna port can be assigned to each terminal. Alternatively, transmission may be performed by sharing the DMRS 205. In this case, it can be distinguished according to the DMRS scrambling sequence which is set by higher layer signaling. For distributed transmission, up to two antenna ports are supported for the DMRS 205, and a diversity scheme of precoder cycling is supported. The DMRS 205 may be shared for all REs transmitted within one PRB pair.

Next, a description is given of the search space for transmission of the downlink control channel in the LTE or LTE-A system.

In LTE, the entire PDCCH region is composed of a logical set of CCEs, and includes a search space composed of a set of CCEs. The search space may be a common search space or a terminal-specific search space. The search space for the LTE PDCCH is defined as in Table 1 below as described in 3GPP TS 36.213.

TABLE 1

The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by $L \{(Y_k + m') \bmod \lfloor N_{CCE, k}/L \rfloor\} + i$ where $Y_k$ is defined below, i = 0, L, L − 1. For the common search space m' = m. For the PDCCH UE specific search space, for the serving cell on which PDCCH is monitored, if the monitoring UE is configured with carrier indicator field then m' = m + $M^{(L)} \cdot n_{CI}$ where $n_{CI}$ is the carrier indicator field value, else if the monitoring UE is not configured with carrier indicator field then m' = m, where m = 0, L, $M^{(L)}$ − 1. $M^{(L)}$ is the number of PDCCH candidates to monitor in the given search space.

Note that the carrier indicator field value is the same as ServCellIndex

For the common search spaces, $Y_k$ is set to 0 for the two aggregation levels L = 4 and L = 8

For the UE-specific search space $S_k^{(L)}$ at aggregation level L, the variable $Y_k$ is defined by $Y_k = (A \cdot Y_{k-1}) \bmod D$ where $Y_{-1} = n_{RNTI} \neq 0$, A = 3982', D = 6553' and k = $\lfloor n_s/2 \rfloor$, $n_s$ is the slot number within a radio frame.

The RNTI value used for $n_{RNTI}$ is defined in subclause 7.1 in downlink and subclause 8 in uplink.

According to the definition of the search space for the PDCCH described in Table 1, the terminal-specific search space is implicitly defined through a function of the UE identity and the subframe number without being explicitly signaled. In other words, since the terminal-specific search space can be changed according to the subframe number, this means that the terminal-specific search space can be changed over time, which solves the problem that a specific terminal cannot use the search space due to other terminals (blocking problem). Although a specific terminal cannot be scheduled in a given subframe because all the CCEs are used by other terminals scheduled in the same subframe, since the search space varies with time, such a problem may not occur in the next subframe. For example, although the terminal-specific search space of terminal #1 and the terminal-specific search space of terminal #2 partially overlap in a specific subframe, as the terminal-specific search space changes for each subframe, it can be expected that the overlap in the next subframe will be different.

According to the definition of the search space for the PDCCH described above, the common search space is defined as a set of pre-agreed CCEs because a certain group of terminals or all terminals must receive the PDCCH. In other words, the common search space does not vary according to the terminal identity or the subframe number. The common search space is used to transmit various system messages, but it can also be used to transmit control information of a specific terminal. As such, the common search space may be a solution to the problem that the terminal cannot be scheduled due to a lack of available resources in the terminal-specific search space.

The search space at a given AL is a set of candidate control channels composed of CCEs where the terminal should attempt decoding. Since there are several ALs that create one group with 1, 2, 4, and 8 CCEs, the terminal has multiple search spaces. The number of PDCCH candidates to be monitored by the terminal in the search space at a given AL in the LTE PDCCH is defined as shown in Table 2 below.

TABLE 2

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

According to Table 2, for the UE-specific search space, {1, 2, 4, 8} ALs are supported with {6, 6, 2, 2} PDCCH candidates, respectively. For the common search space, {4, 8} ALs are supported with {4, 2} PDCCH candidates, respectively. The reason that the common search space supports only ALs {4, 8} is to improve the coverage characteristics because system messages generally have to reach the edge of the cell.

The DCI transmitted via the common search space is defined only for some DCI formats such as 0/1A/3/3A/1C, which are used for system messages or power control for terminal groups. The DCI format with spatial multiplexing is not supported in the common search space. The downlink DCI format to be decoded in the terminal-specific search space varies depending on the transmission mode set for the corresponding terminal. Since the transmission mode is set through RRC signaling, the accurate subframe number is not specified as to whether the setting is effective for the terminal. Hence, the terminal can operate so as not to lose the communication by always decoding DCI format 1A regardless of the transmission mode.

Hereinabove, a description has been given of the downlink control channel, a method for transmitting and receiving DCI, and the search space in the existing LTE or LTE-A system.

Next, a description is given of the downlink control channel in the 5G communication system being currently discussed with reference to the drawings.

Figure 3:
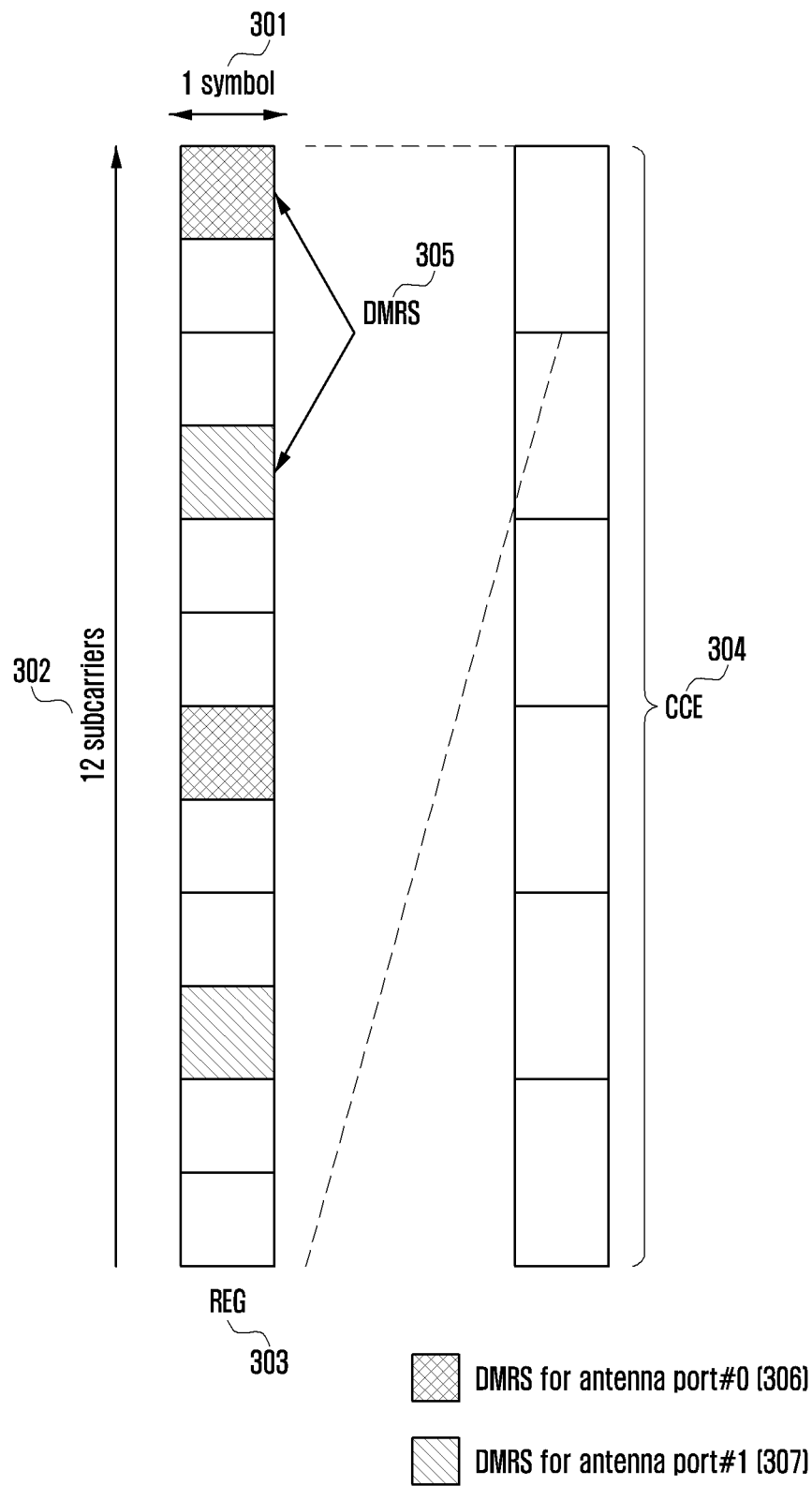
FIG. 3 illustrates transmission resources of a 5th generation (5G) downlink control channel according to an embodiment of the disclosure.

FIG. 3 illustrates a basic unit of time-frequency resources constituting a downlink control channel usable in a 5G communication system according to an embodiment of the disclosure.

Referring to FIG. 3, the basic unit (REG) of the time-frequency resources constituting the control channel is composed of one OFDM symbol 301 in the time domain and 12 subcarriers 302 (i.e., 1 RB) in the frequency domain. In the basic unit of the control channel, by assuming that the time-domain unit is one OFDM symbol 301, the data channel and the control channel can be time-multiplexed within one subframe. By placing the control channel ahead of the data channel, the processing time of the user can be reduced, facilitating satisfaction of the latency requirement. By setting the frequency-domain unit of the control channel to 1 RB (302), frequency multiplexing between the control channel and the data channel can be performed more efficiently.

By concatenating the REGs 303 shown in FIG. 3, control channel regions of various sizes can be configured. When the basic unit for allocation of the downlink control channel in the 5G system is a CCE 304, one CCE 304 may be composed of plural REGs 303. By way of example, the REG 303 shown in FIG. 3 may be composed of 12 REs, and if one CCE 304 is composed of 6 REGs 303, one CCE 304 may be composed of 72 REs. When a downlink control region is configured, the downlink control region may be composed of plural CCEs 304, and a specific downlink control channel may be mapped to one CCE 304 or plural CCEs 304 in the control region for transmission according to the AL. The CCEs 304 in the control region are identified by their numbers, and the numbers can be assigned according to the logical mapping scheme.

The basic unit of the downlink control channel shown in FIG. 3, that is, the REG 303, may include the REs to which the DCI is mapped and a region to which the DMRS 305 serving as a reference signal for decoding the DCI is mapped. The DMRS 305 may be mapped in consideration of the number of antenna ports used to transmit the downlink control channel. In FIG. 3, two antenna ports are used. There may be a DMRS 306 transmitted for antenna port #0 and a DMRS 307 transmitted for antenna port #1. The DMRS for different antenna ports can be multiplexed in various ways. In FIG. 3, DMRSs corresponding to different antenna ports are orthogonally transmitted via different REs. The DMRS can be FDMed or CDMed for transmission. There may be various other DMRS patterns in association with the number of antenna ports.

Figure 4:
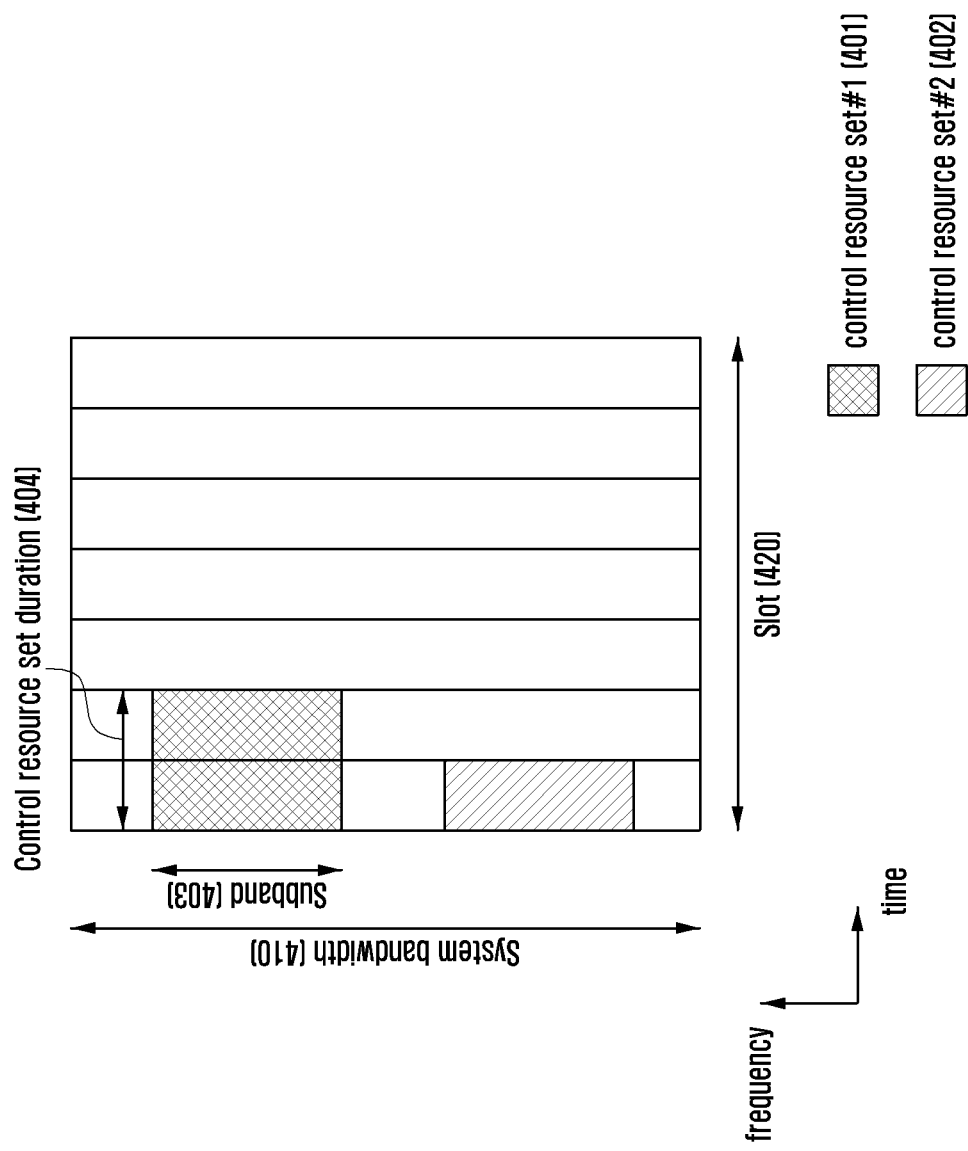
FIG. 4 illustrates resource region allocation for a 5G downlink control channel according to an embodiment of the disclosure.

FIG. 4 shows a control region (control resource set (CORESET)) in which the downlink control channel is transmitted in a 5G wireless communication system according to an embodiment of the disclosure.

Referring to FIG. 4, two control regions (control region #1 (401) and control region #2 (402)) are configured in the system bandwidth 410 of the frequency domain and one slot 420 of the time domain (one slot is assumed to include 7 OFDM symbols). In the frequency domain, the control regions 401 and 402 may be set in specific subbands 403 within the overall system bandwidth 410. In the time domain, the control region may include one or plural OFDM symbols, and the number of such OFDM symbols may be referred to as the control region length (control resource set duration 404). In FIG. 4, control region #1 (401) is configured to have a control region length of 2 symbols, and control region #2 (402) is configured to have a control region length of 1 symbol.

In the 5G communication system, a plurality of control regions can be configured in one system from the base station perspective. Also, a plurality of control regions can be configured for one terminal from the terminal perspective. Further, a portion of the control region configured in the system can be set in the terminal. Consequently, the terminal may be unaware of a specific control region existing in the system. For example, in FIG. 4, two control regions (control region #1 (401) and control region #2 (402) are configured in the system, and control region #1 (401) can be assigned to terminal #1 and control region #1 (401) and control region #2 (402) can be assigned to terminal #2. If there is no additional indicator, terminal #1 may be unaware of the existence of control region #2 (402).

In the above-described 5G wireless communication system, the control region can be configured by the base station for the terminal through higher layer signaling (e.g., system information or RRC signaling). Configuring the control region for the terminal means providing information related to the location of the control region, the sub-band, resource allocation of the control region, and the control region length. For example, the base station may provide at least one of the following information about the control region by configuring the control region for the terminal.

TABLE 3

Configuration information 1. Frequency domain RB allocation information
Configuration information 2. Time domain control region length (number of symbols assigned to control region, start symbol)
Configuration information 3. Resource mapping scheme (time-first mapping, frequency-first mapping)
Configuration information 4. Transmission mode (interleaved transmission mode, non-interleaved transmission mode)
Configuration information 5. Search space type (common search space, group-common search space, terminal-specific search space)
Configuration information 6. Monitoring occasion (monitoring period/interval, monitoring symbol location in slot)
Configuration information 7. DMRS configuration information (DMRS configuration, number of DMRS ports)
Configuration information 8. REG bundling size In addition to the above configuration information, various information necessary for transmitting the downlink control channel may be configured for the terminal.

Hereinabove, a description has been given of the downlink control channel in the 5G communication system being currently discussed.

Next, a description is given of a method of reusing the control region configured to transmit a downlink control channel for data channel transmission in the 5G communication system.

In the 5G communication system, a portion of the control region is reused to transmit the data channel so as to increase the resource efficiency. More specifically, the base station can use the time-frequency resources not used for actual DCI transmission in the control region for data channel transmission, and transmit an indicator indicating reuse of the control region to the terminal so that the terminal can correctly receive the corresponding data channel. In addition, to reuse the control region for data channel transmission, if the resource region used to transmit the data channel overlaps the DCI transmission region containing the scheduling information for the data channel, the data channel of the overlapped portion can be rate-matched for transmission. For other DCI, rate matching is not allowed, and the corresponding control region cannot be reused for data channel transmission.

The disclosure proposes a method for transmitting and receiving the DCI between the base station and the terminal in an environment where the control region can be reused for data channel transmission. In the disclosure, the terminal may first detect the DCI format associated with the downlink assignment through blind decoding and obtain scheduling information about the corresponding downlink data channel. The terminal may determine whether the transmission of the downlink data channel reuses a portion of the control region. If the control region is reused, the terminal can assume that no additional DCI is transmitted in the search space present in the corresponding region. Hence, blind decoding for the other DCI format can be performed only for the remaining search space except for the reused resource region, and the number of blind decodings of the terminal can be efficiently reduced. To perform scheduling for the DCI and the data channel, the base station can perform scheduling in consideration of the resource reuse of the control region. The base station can determine whether to use the control region for the data channel by examining how much the time-frequency resource at which the data channel is to be allocated overlaps with the search space of the corresponding terminal. Additionally, the base station can perform resource allocation in the entire search space for the DCI containing the scheduling information for the data channel, and allocate resources in the search space in the control region that does not overlap the data channel for the other DCIs.

Figure 5:
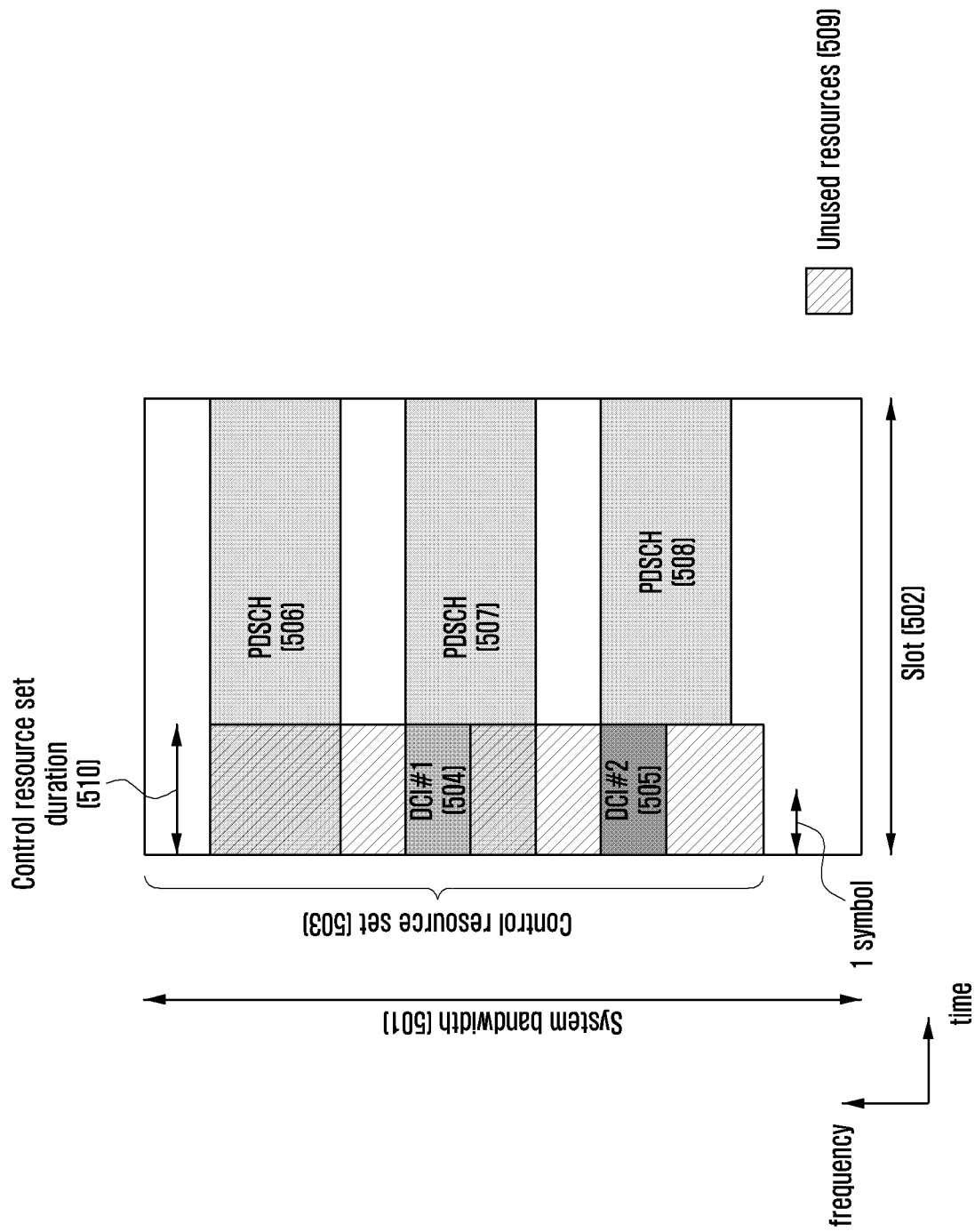
FIG. 5 shows an example of a physical downlink shared channel (PDSCH) transmission with reuse of a control region considered in 5G communication according to an embodiment of the disclosure.

FIG. 5 illustrates an example of transmitting a downlink data channel by reusing a control region, which is considered in a 5G communication system according to an embodiment of the disclosure.

Referring to FIG. 5, a control region 503 CORESET is configured in time-frequency resources given by the system bandwidth 501 of the frequency domain and one slot 502 of the time domain. The control region is allocated over two OFDM symbols in the time domain (i.e., the control region length 510=2 symbols). Two different DCIs are transmitted in the control region 503 of FIG. 5. DCI #1 (504) is a DCI that contains scheduling information corresponding to the downlink scheduling assignment (i.e., PDSCH 506, 507 or 508), and DCI #2 (505) is a DCI that contains other information corresponding to, e.g., the uplink scheduling grant.

In the example of FIG. 5, the PDSCH may be mapped for transmission to the time-frequency resource 509 not used for DCI transmission in the control region. More specifically, the following schemes can be considered.

Scheme 1

If the time-frequency resource for PDSCH transmission overlaps the configured control region and no DCI is transmitted through the overlapping resource, the corresponding resource can be reused for PDSCH transmission. For example, in FIG. 5, for the PDSCH 506, as no DCI is transmitted via the resource to which the PDSCH 506 is allocated, it can be mapped to the unused resource 509 in the control region for transmission. Hence, the PDSCH 506 may be mapped to the first and subsequent OFDM symbols at the corresponding frequency location for transmission.

Scheme 2

If the time-frequency resource for PDSCH transmission overlaps the configured control region and a DCI containing scheduling information for the PDSCH is mapped for transmission to all or a part of the overlapped region, the PDSCH can be transmitted by reusing the resource in the control region. The PDSCH can be rate-matched for transmission in a portion of the PDSCH transmission resource overlapping with the DCI transmission resource. For example, in FIG. 5, when DCI #1 (504) corresponds to the scheduling control information for the PDSCH 507, the PDSCH 507 is rate-matched in the resource region where DCI #1 (504) is transmitted, and other resources in the unused control region may be reused for transmitting the PDSCH 507. Hence, the PDSCH 507 may be mapped for transmission to the first and subsequent OFDM symbols at the corresponding frequency location and may be rate-matched in the resource region where DCI #1 (504) is transmitted.

The terminal may obtain DCI #1 (504) through blind decoding and obtain information on the resource used for DCI #1 (504). The terminal may implicitly know the portion of the resource allocated to the PDSCH 507 that is rate-matched. Hence, the terminal can successfully decode the PDSCH 507.

Scheme 3

If the time-frequency resource for PDSCH transmission overlaps the configured control region and a DCI containing scheduling information not associated with the PDSCH is mapped for transmission to all or a part of the overlapped region, the PDSCH cannot be transmitted by reusing the resource in the control region. For example, in FIG. 5, when DCI #2 (505) corresponds to the control information for the uplink grant, the PDSCH 508 cannot be transmitted in a region overlapping with DCI #2 (505) among the resources in the control region, and thus can be transmitted via the third and subsequent OFDM symbols being later in time than the control region length 510.

Hereinabove, a description has been given of reusing the control region for data channel transmission in the 5G communication system.

The disclosure proposes a method that enables the base station and the terminal to effectively transmit and receive the DCI in an environment where the control region can be reused for data channel transmission.

In the disclosure, for blind decoding on the DCI, the terminal may perform blind decoding on a specific DCI format first and perform reduced blind decoding on other DCI formats. That is, the terminal can perform blind decoding in sequence according to the type of the DCI, thereby reducing power consumption of the terminal.

In the disclosure, the base station can determine whether to reuse the control region to transmit the PDSCH of a specific terminal on the basis of the level of overlap between the search space of the terminal and the PDSCH transmission resource. This can be based on a specific threshold, and the threshold can be determined by the base station. Hence, it is possible to effectively manage the trade-off between an increase in resource efficiency due to reuse of a resource in the control region and a reduction in power consumption of the terminal.

In the disclosure, for resource allocation of the DCI, the base station may assign the total search space for a specific DCI format and assign a part of the search space for another DCI format. Hence, the control region resource can be reused more effectively for data channel transmission.

Next, a description is given of various embodiments for a method and apparatus for transmitting and receiving the DCI proposed in the disclosure for the 5G communication system.

An embodiment of the disclosure relates to a method by which the terminal performs blind decoding on the DCI.

Figure 6:
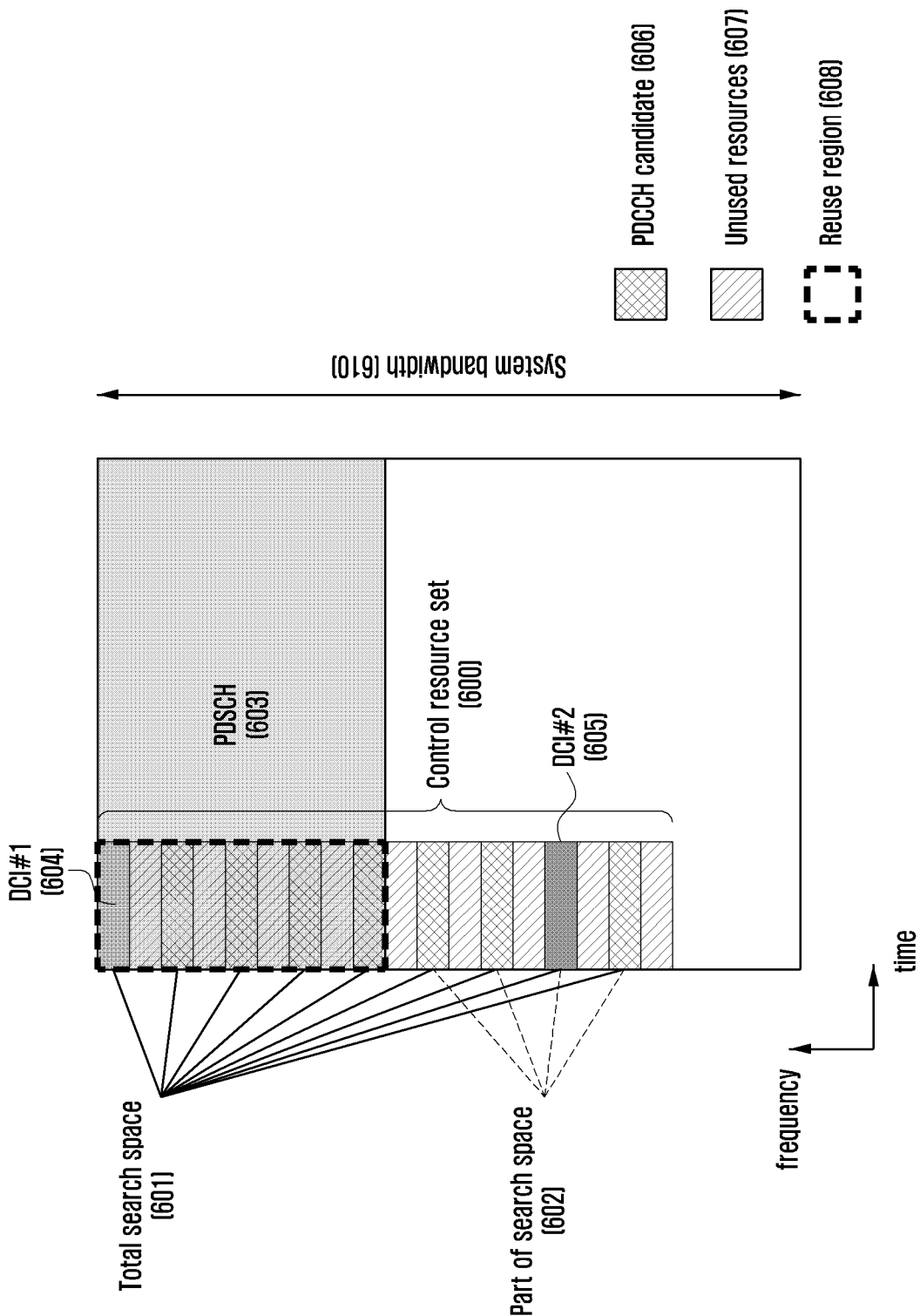
FIG. 6 illustrates a method by which a terminal performs blind decoding on a DCI an according to embodiment of the disclosure.

FIG. 6 illustrates a method by which a terminal performs blind decoding on a DCI an according to embodiment of the disclosure.

Referring to FIG. 6, when there is one control region 600 in a system bandwidth 610, a PDSCH 603 is transmitted by reusing a resource in the control region 600. In the control region 600, a search space 601 of the corresponding terminal is present, and the search space 601 may be a set of PDCCH candidates 606. The base station may transmit the DCI to the terminal by mapping the DCI to a specific set of PDCCH candidates 606 in the search space 601 of the terminal. Then, the terminal can obtain its DCI by performing blind decoding on the PDCCH candidates 606 corresponding to the search space 601.

In FIG. 6, two DCIs (DCI #1 (604) and DCI #2 (605)) are transmitted. DCI #1 (604) may correspond to a DCI format associated with a downlink scheduling assignment containing scheduling information for the PDSCH 603, and DCI #2 (605) may correspond to a DCI format transmitted for a different purpose (e.g., uplink scheduling grant, power control, preemption indication, slot format indication, or bandwidth part indication). DCI #1 (604) and DCI #2 (605) may be mapped respectively to specific sets of PDCCH candidates 606 in the search space 601 for transmission.

In FIG. 6, the PDSCH 603 can reuse the resource in the control region 600 as shown in reuse region 608 of the control region 600 or contain unused resources (607). As described before, DCI #1 (604) scheduling the PDSCH 603 may be transmitted via a specific PDCCH candidates 606 of the reuse region 608, and the PDSCH 603 may be rate-matched for transmission in the resource region where DCI #1 (604) is transmitted.

The terminal can obtain DCI #1 (604) through blind decoding on the total search space 601 and obtain the resource allocation information for the PDSCH 603 from DCI #1 (604). Also, the terminal may determine whether the PDSCH 603 reuses a resource in the control region (or, the start point of the OFDM symbols to which the PDSCH 603 is mapped) based on the resource allocation information for the PDSCH 603. Thereby, the terminal can recognize the reuse region 608 among the control region 600, and determine whether DCI #1 (604) obtained through blind decoding has been transmitted via specific PDCCH candidates 606 in the reuse region 608. If DCI #1 (604) has been transmitted via the reuse region 608, the terminal can assume that the PDSCH 603 is rate-matched in the resource where the DCI #1 (604) is transmitted and correctly decode the PDSCH 603. If DCI #1 (604) has been transmitted outside the reuse region 608, the terminal can assume that no DCI has been transmitted via the search space 601 in the reuse region 608 and thus can perform decoding without assuming that a part of the PDSCH 603 transmitted through the reuse region 608 is rate-matched. As such, the terminal may successfully decode the PDSCH 603 for both the case where the DCI #1 (604) is transmitted via the reuse region 608 and the case where the DCI #1 (604) is transmitted outside the reuse region 608.

As described above, the terminal can obtain the resource allocation information for the PDSCH 603 based on DCI #1 (604) detected through blind decoding. Also, the terminal may determine whether a resource in the control region is reused for transmitting the PDSCH 603 (or, the start symbol among the OFDM symbols to which the PDSCH 603 is mapped), i.e., recognize the reuse region 608. In addition, the terminal may assume that no DCI other than the DCI scheduling the PDSCH 603 has been transmitted inside the reuse region 608. Hence, when performing blind decoding on another DCI format after obtaining the DCI scheduling the PDSCH 603, the terminal can perform blind decoding only on the remaining search space (or a part of a search space 602) excluding the search space 601 present in the reuse region 608. For example, in FIG. 6, when performing blind decoding on DCI #2 (605), the terminal may perform blind decoding only on the PDCCH candidates 606 in the remaining search space 602 excluding the search space present in the reuse region 608. Therefore, it is possible to reduce the number of blind decodings on the other DCI formats excluding DCI #1 (604).

Figure 7:
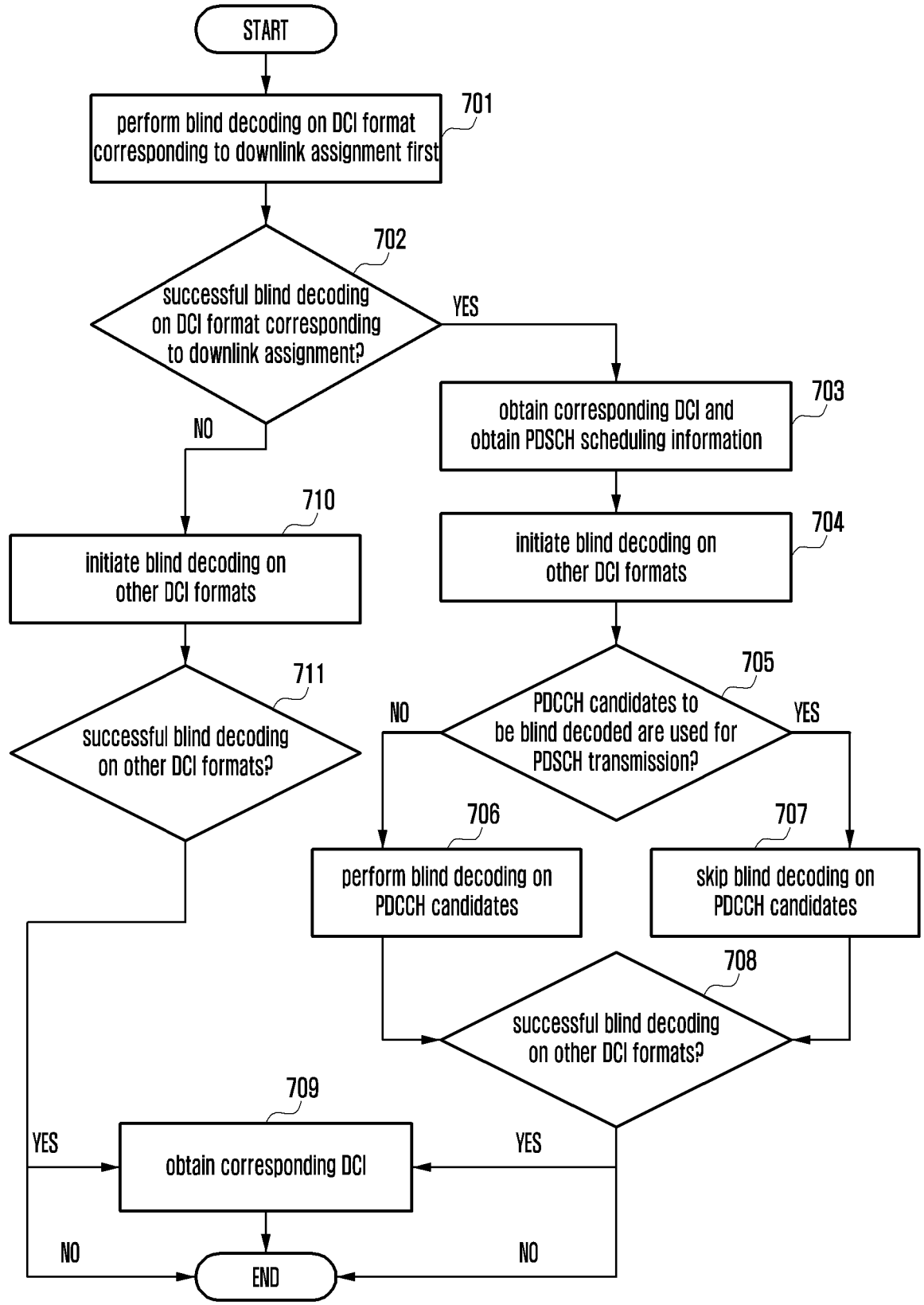
FIG. 7 is a flowchart showing operations of a terminal according to an embodiment of the disclosure.

FIG. 7 is a flowchart showing operations of a terminal according to an embodiment of the disclosure.

Referring to FIG. 7, at operation 701, the terminal may first perform blind decoding on the DCI format corresponding to the downlink scheduling assignment. At this time, the terminal can perform blind decoding for the total search space. At operation 702, the terminal may determine whether blind decoding has been successful on the DCI format corresponding to the downlink scheduling assignment.

If blind decoding has been successful on the DCI format corresponding to the downlink scheduling assignment, at operation 703, the terminal can obtain the scheduling information for the PDSCH from the detected DCI. The terminal may obtain the resource allocation information of the PDSCH from the scheduling information for the PDSCH, and may determine whether the resource in the control region is reused for PDSCH transmission. At operation 704, the terminal may initiate blind decoding on the other DCI formats except for the DCI format corresponding to the downlink scheduling assignment (e.g., uplink scheduling grant, power control, preemption indication, slot format indication, or bandwidth part indication, being collectively referred to as "other DCI format").

At operation 705, to perform blind decoding for the other DCI formats, the terminal may determine whether the PDCCH candidates to be blind decoded corresponds to the resource used for the PDSCH transmission. Upon determining that the resource to which the PDCCH candidates to be blind decoded are allocated is not used for the PDSCH transmission, at operation 706, the terminal may perform blind decoding on the PDCCH candidates. Upon determining that the resource to which the PDCCH candidates to be blind decoded are allocated is used for the PDSCH transmission, at operation 707, the terminal may skip blind decoding on the PDCCH candidates. Consequently, in blind decoding for other DCI formats, the terminal can perform blind decoding only on the remaining search space (or a part of the search space) excluding the resource region used for PDSCH transmission.

At operation 708, the terminal may determine whether blind decoding for the other DCI formats has been successful. If blind decoding for the other DCI formats has been successful, at operation 709, the terminal may obtain the corresponding DCI and end the procedure. If blind decoding for the other DCI formats has been unsuccessful, the terminal may end the procedure.

If blind decoding has been unsuccessful on the DCI format corresponding to the downlink scheduling assignment at operation 702, at operation 710, the terminal may initiate blind decoding on the other DCI formats except for the DCI format corresponding to the downlink scheduling assignment. At operation 711, the terminal may determine whether blind decoding for the other DCI formats has been successful. If blind decoding for the other DCI formats has been successful, at operation 709, the terminal may obtain the corresponding DCI and end the procedure. If blind decoding for the other DCI formats has been unsuccessful, the terminal may end the procedure.

Another embodiment of the disclosure relates to a method for the base station to schedule the PDSCH.

Figure 8:
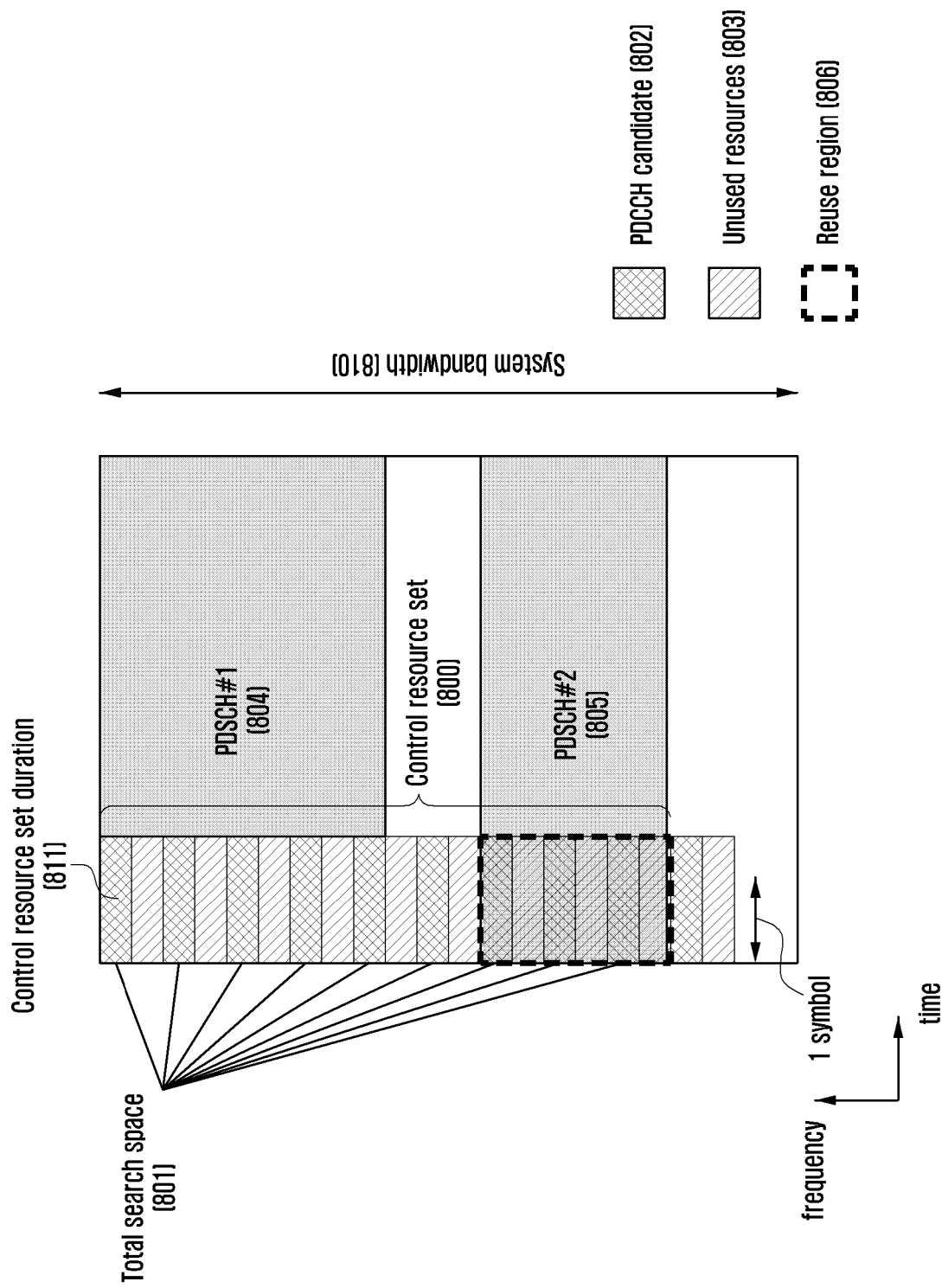
FIG. 8 illustrates a method for a base station to schedule a PDSCH according to an embodiment of the disclosure.

FIG. 8 illustrates a method for a base station to schedule a PDSCH according to an embodiment of the disclosure.

Referring to FIG. 8, a control region (control resource set) 800 for a terminal is configured within a system bandwidth 810, where a control region length 811 corresponds to two OFDM symbols. In the control region 800, there may be a total search space 801 composed of a set of PDCCH candidates 802 for the terminal. To allocate PDSCH resources for the terminal, the base station can reuse resources in the control region 800. The base station can determine whether to reuse resources (i.e., the start symbol among the OFDM symbols to which the PDSCH is mapped in the time domain) in consideration of the search space 801 of the terminal.

More specifically, the frequency-domain resource for the PDSCH of a terminal may overlap with the frequency-domain resource for the control region. For the time-domain resource allocation of the PDSCH, it is possible to consider whether to reuse the resource in the control region. Upon determining to reuse the resource in the control region, the PDSCH may be mapped to those symbols constituting the control region (e.g. from the first symbol). Upon determining not to reuse the resource in the control region, the PDSCH may be mapped to those symbols not constituting the control region (e.g. from the third symbol in FIG. 8).

In this case, the base station can determine whether to permit the PDSCH to reuse the resource in the control region on the basis of the overlap ratio between the reuse resource of the control region to which the PDSCH is to be mapped and the search space of the terminal. For example, when the PDSCH is assumed to reuse a transmission resource in the control region, as a specific resource in the control region is reused, the PDSCH transmission resource may overlap with the transmission resource in which some PDCCH candidates of the search space in the control region are allocated. The ratio of the PDCCH candidates overlapping the PDSCH transmission resource among the PDCCH candidates in the total search space can be referred to as the overlap ratio. For example, the overlap ratio can be represented by Equation 1 below.

$$\text{Overlap ratio} = \frac{\text{the number of PDCCH candidates overlapping the PDSCH transmission resource}}{\text{the total number of PDCCH candidates}} \quad \text{Equation 1}$$

Likewise, the overlap ratio described above may be interpreted in terms of a non-overlap ratio (i.e., non-overlap ratio=1−overlap ratio). The base station may determine whether the overlap ratio (non-overlap ratio) is greater than (less than) a given threshold. If the overlap ratio is greater than the threshold (or, if the non-overlap ratio is less than the threshold), transmitting the PDSCH by reusing a resource in the control region may excessively reduce the PDCCH candidates to be used for control information transmission. Hence, the terminal can determine not to reuse the control region resource for the PDSCH, and can determine the time domain resource allocation for the PDSCH correspondingly. On the contrary, if the overlap ratio is less than the threshold (or, if the non-overlap ratio is greater than the threshold), transmitting the PDSCH by reusing a resource in the control region may not excessively reduce the PDCCH candidates to be used for control information transmission. Hence, the terminal can determine to reuse the control region resource for the PDSCH, and can determine the time domain resource allocation for the PDSCH correspondingly. That is, the base station may determine the start symbol among the OFDM symbols to which the PDSCH is mapped or allocated.

A description is given of an example with reference to FIG. 8. In FIG. 8, the total search space 801 is composed of 10 PDCCH candidates 802. The threshold (η) to be compared with the overlap ratio is assumed to be 45 percent. This threshold value may be determined in advance by the terminal and/or the base station, and may be shared in advance between the terminal and the base station via a physical layer signal or higher layer signal.

For example, the base station can determine the frequency domain resource of PDSCH #1 (804) for a terminal first, and determine whether to reuse the resource in the control region 800 for the terminal. If PDSCH #1 (804) reuses the resource in the control region 800 (i.e., time-domain resource allocation is performed from the first OFDM symbol), PDSCH #1 (804) may overlap with 5 PDCCH candidates among the 10 PDCCH candidates 802 in the total search space 801. The overlap ratio can be calculated to be 50 percent. As the overlap ratio is greater than the preset threshold (45 percent), the base station may determine not to reuse the resource in the control region 800 for PDSCH #1 (804). This is because scheduling diversity for other DCI formats may be not sufficiently secured if PDSCH #1 (804) is transmitted by reusing a resource in the control region 800. Consequently, the time domain resource allocation for PDSCH #1 (804) can be started from the third OFDM symbol, which is not included in the control region 800.

As another example, the base station can determine the frequency domain resource of PDSCH #2 (805) for a terminal first, and determine whether to reuse the resource in the control region 800 for the terminal. If PDSCH #2 (805) reuses the resource in the control region 800 (i.e., time-domain resource allocation is performed from the first OFDM symbol), PDSCH #2 (805) may overlap with 4 PDCCH candidates among the 10 PDCCH candidates 802 in the total search space 801. The overlap ratio can be calculated to be 40 percent. As the overlap ratio is less than the preset threshold (45 percent), the base station may determine to reuse the resource in the control region 800 for PDSCH #2 (805). This is because scheduling diversity for other DCI formats can be sufficiently secured even if PDSCH #2 (805) is transmitted by reusing a resource in the control region 800. Consequently, the time domain resource allocation for PDSCH #2 (805) can be started from the first OFDM symbol, which is included in the control region 800. FIG. 8 shows the result of allocation of resources for PDSCH #2 (805) by reusing a portion (reuse region 806) of the control region 804.

Figure 9:
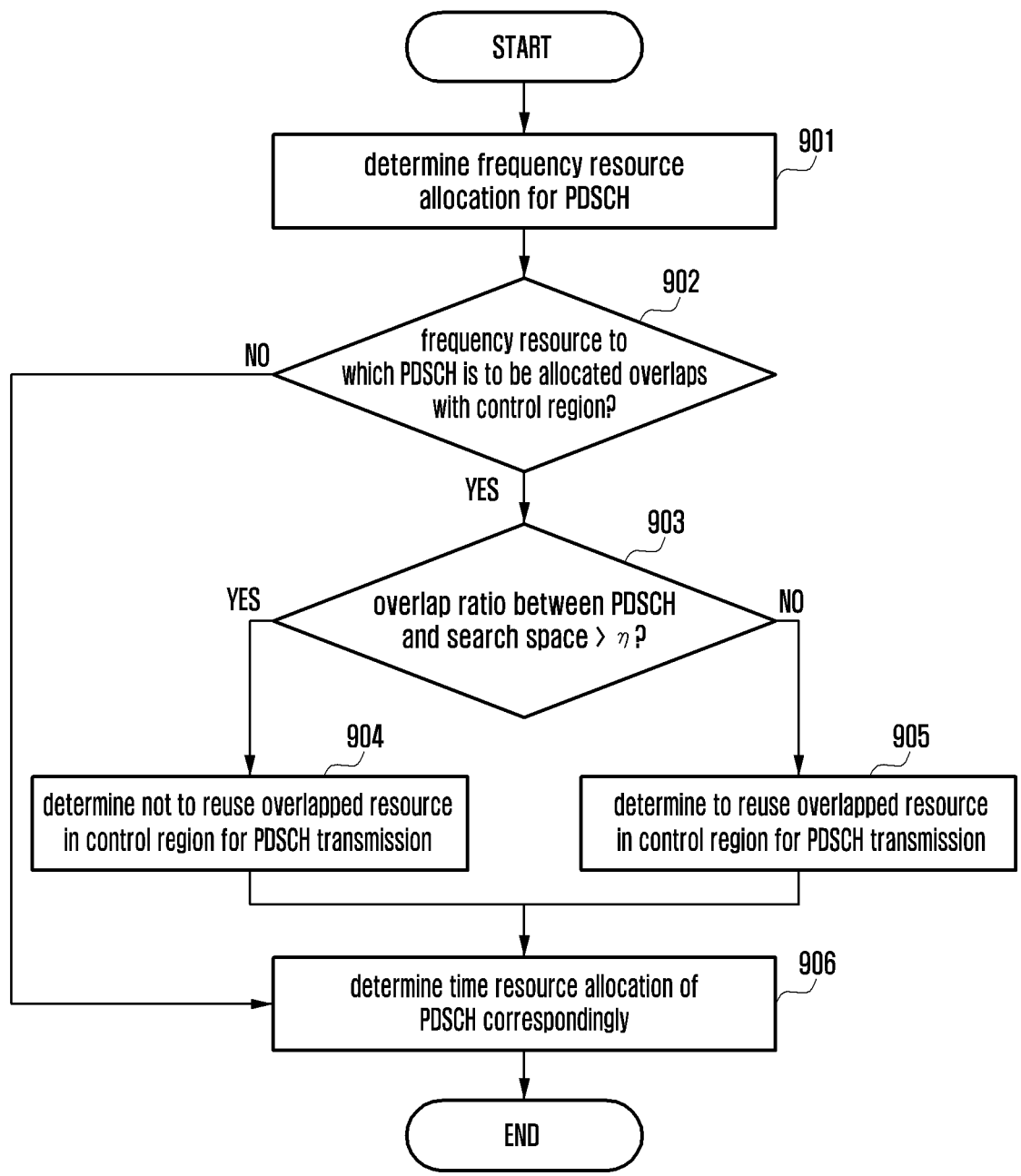
FIG. 9 is a flowchart showing operations of a base station according to an embodiment of the disclosure.

FIG. 9 is a flowchart showing operations of a base station according to an embodiment of the disclosure.

Referring to FIG. 9, at operation 901, the base station may determine allocation of the frequency domain resource of the PDSCH for a terminal. At operation 902, the base station may determine whether the frequency domain resource to which the PDSCH is to be allocated overlaps with the control region specified for the terminal.

Upon determining that the frequency domain resource to which the PDSCH is to be allocated does not overlap with the control region, at operation 906, the base station may determine the time domain resource allocation of the PDSCH correspondingly.

Upon determining that the frequency domain resource to which the PDSCH is to be allocated overlaps with the control region, at operation 903, the base station may determine whether to reuse the resource in the control region for PDSCH transmission. In the second embodiment, the base station can determine this based on the overlap ratio between the PDSCH to be transmitted and the search space (it can also be determined based on the non-overlap ratio). If the overlap ratio is greater than the preset threshold (η), at operation 904, the base station may determine not to reuse the resource in the control region for PDSCH transmission. At operation 906, the base station may determine the time domain resource allocation of the PDSCH correspondingly. That is, the time domain resource allocation for the PDSCH can be started from the OFDM symbol not included in the control region. Conversely, if the overlap ratio is less than the preset threshold (η), at operation 905, the base station may determine to reuse the resource in the control region for PDSCH transmission. At operation 906, the base station may determine the time domain resource allocation of the PDSCH correspondingly. That is, the time domain resource allocation for the PDSCH can be started from the OFDM symbol included in the control region (e.g. first OFDM symbol).

In the second embodiment, the base station may adjust the frequency of reusing the control region for PDSCH transmission by adjusting the threshold value described above.

For example, if the threshold is set to a large value, the frequency of reuse of the control region can be increased. That is, if the threshold is set to a large value, the base station can reuse the resource in the control region for PDSCH transmission with a high probability. In this case, the overall resource efficiency can be increased by more actively reusing the unused portion of the control region for the PDSCH. This may be advantageous when a relatively small number of terminals are present in the system or when the DCI to be transmitted by the base station is small in a low traffic environment.

For example, if the threshold is set to a small value, the frequency of reuse of the control region can be decreased. That is, if the threshold is set to a small value, the base station can reuse the resource in the control region for PDSCH transmission with a low probability. In this case, it is possible to relatively increase the amount of resources available for DCI transmission in the control region by passively reusing the unused portion of the control region for the PDSCH. Hence, the scheduling diversity for DCI transmission in the control region can be increased. This may be advantageous when a relatively large number of terminals are present in the system or when the DCI to be transmitted by the base station is large in a heavy traffic environment.

When the first and second embodiments of the disclosure are applied in combination, the number of blind decodings of the terminal can be adjusted according to the threshold value specified by the base station. For example, if the threshold is set to a large value, the frequency of reuse of the control region can be increased. This means more active reusing the resource in the control region for PDSCH transmission. This also indicates a decrease in the number of PDCCH candidates in the search space available for other DCI formats excluding the DCI format corresponding to the downlink scheduling assignment. Hence, if the threshold is set to a large value by the base station in the second embodiment, the number of PDCCH candidates to be monitored for other DCI formats by the terminal in the first embodiment is reduced. As the number of blind decodings for other DCI formats decreases, the burden of blind decoding of the terminal can be reduced. This may lead to a reduction in power consumption of the terminal.

Conversely, if the threshold is set to a small value, the frequency of reuse of the control region can be decreased. This means more passive reusing the resource in the control region for PDSCH transmission. This also indicates an increase in the number of PDCCH candidates in the search space available for other DCI formats excluding the DCI format corresponding to the downlink scheduling assignment. Hence, if the threshold is set to a small value by the base station in the second embodiment, the number of PDCCH candidates to be monitored for other DCI formats by the terminal in the first embodiment is increased. Consequently, while the frequency of blind decoding for other DCI formats may become large in the terminal, the number of PDCCH candidates available for other DCI formats increases to thereby enhance the scheduling diversity in the base station.

Another embodiment of the disclosure relates to a method for the base station to schedule the DCI.

Figure 10:
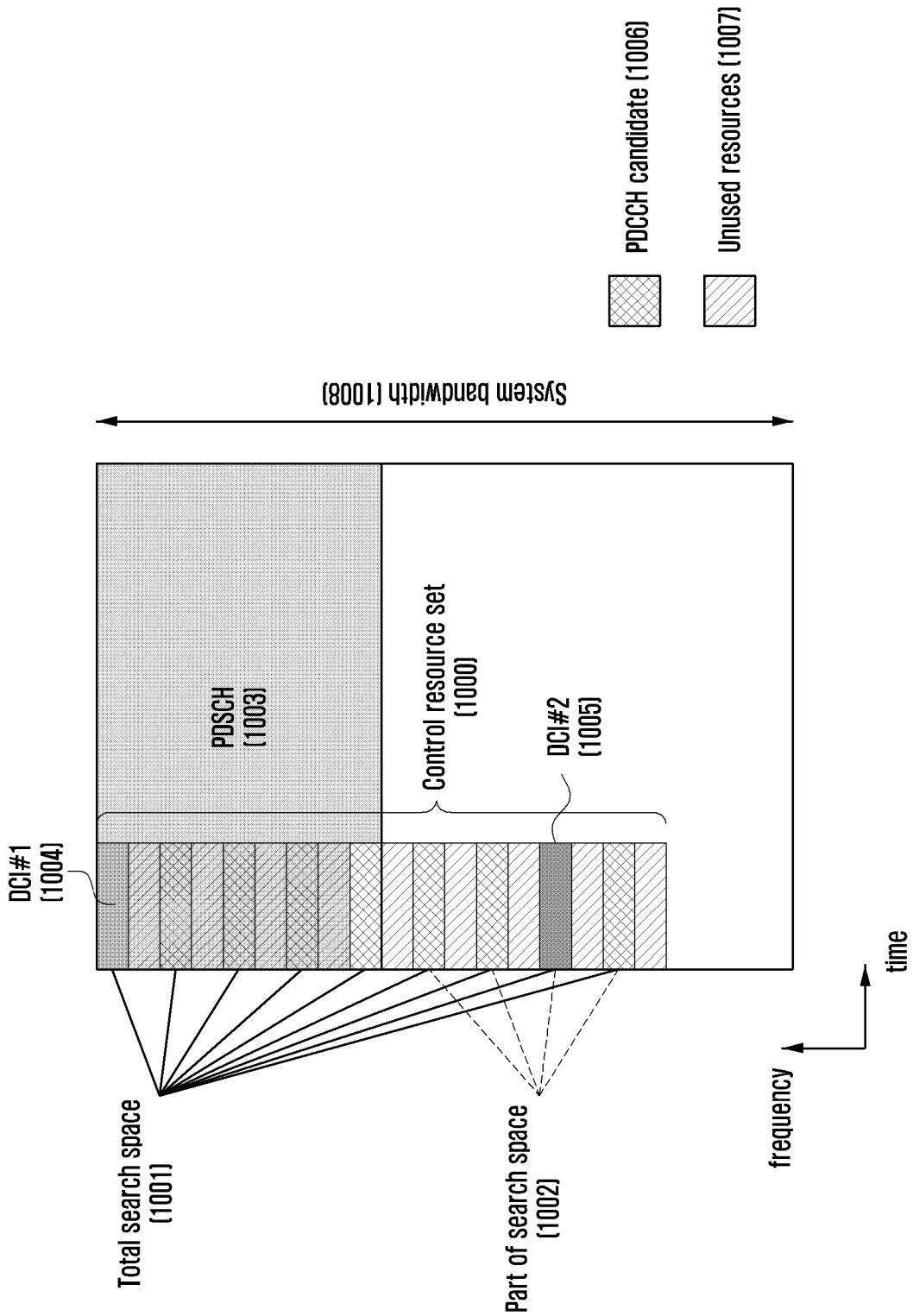
FIG. 10 illustrates a method for a base station to schedule a DCI according to an embodiment of the disclosure.

FIG. 10 illustrates a method for a base station to schedule a DCI according to an embodiment of the disclosure.

Referring to FIG. 10, there is one control region 1000 within a system bandwidth 1008, and a PDSCH 1003 is transmitted by reusing the resource in the control region 1000 according to the above-described second embodiment. In the control region 1000, there may be a search space 1001 composed of a set of PDCCH candidates 1006 for the terminal.

In FIG. 10, two DCIs (DCI #1 (1004) and DCI #2 (1005)) are transmitted. DCI #1 (1004) may correspond to a DCI format associated with a downlink scheduling assignment containing scheduling information for the PDSCH 1003, and DCI #2 (1005) may correspond to a DCI format transmitted for a different purpose (e.g., uplink scheduling grant, power control, preemption indication, slot format indication, or bandwidth part indication). DCI #1 (1004) and DCI #2 (1005) may be mapped respectively to specific sets of PDCCH candidates 1006 in the search space 1001 for transmission.

In the third embodiment, to map the DCI to specific PDCCH candidates for transmission, the base station may determine the resource allocation for DCI transmission differently according to the DCI format. More specifically, for the DCI format corresponding to the downlink scheduling assignment, the base station can map the corresponding DCI to specific PDCCH candidates (i.e., candidates selected from the PDCCH candidates reused for PDSCH transmission in the search space) in the total search space. For other DCI formats, the base station can map the corresponding DCI to specific PDCCH candidates (i.e., candidates selected from the PDCCH candidates not reused for PDSCH transmission in the search space) in the remaining search space not reused for PDSCH transmission. For example, in FIG. 10, the base station can map DCI #1 (1004) corresponding to the downlink scheduling assignment to one PDCCH candidate 1006 in the total search space 1001 for transmission. The base station may map DCI #2 (1005), corresponding to the other DCI formats other than the downlink scheduling assignment, to one PDCCH candidate 1006 of a part 1002 of the search space that is not used for PDSCH transmission (i.e., not overlapping with the PDSCH transmission resource). There may also be unused resources (1007).

Figure 11:
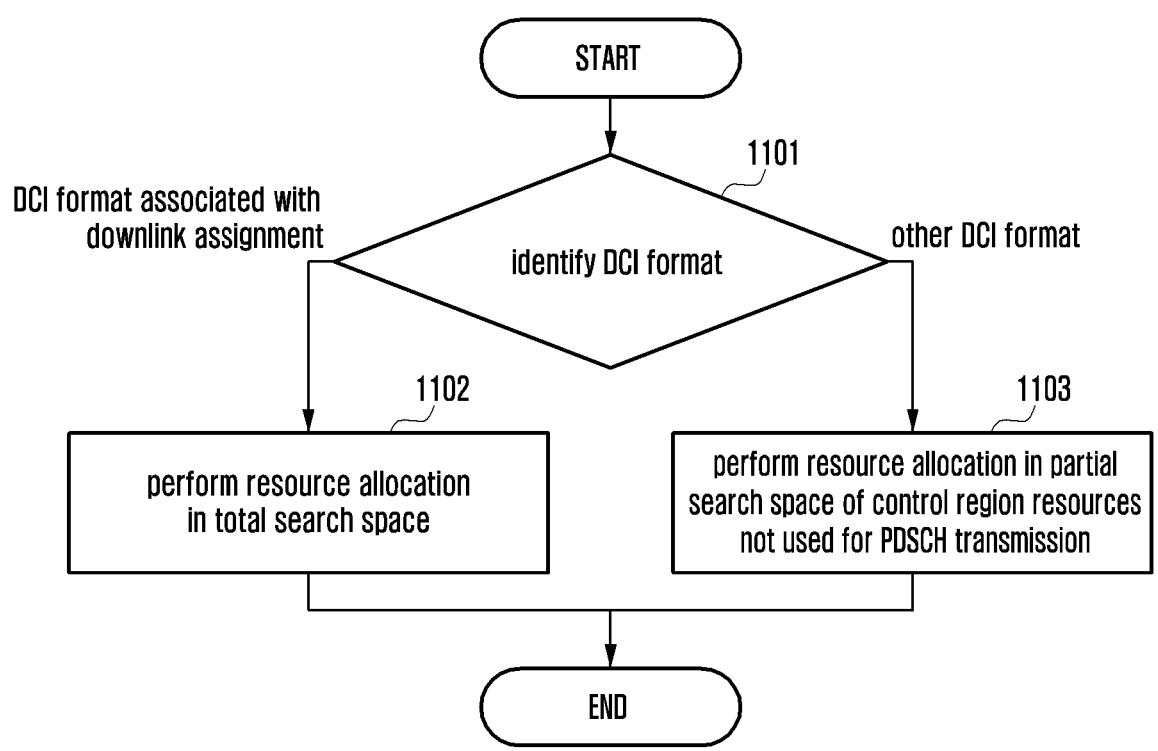
FIG. 11 is a flowchart showing operations of the base station according to an embodiment of the disclosure.

FIG. 11 is a flowchart showing operations of a base station according to an embodiment of the disclosure.

Referring to FIG. 11, at operation 1101, the base station may identify the format of the DCI to be scheduled. If the DCI format to be scheduled corresponds to the downlink scheduling assignment, at operation 1102, the base station may map the corresponding DCI for transmission to a resource associated with a specific PDCCH candidate of the resource region in which the PDSCH related to the DCI format is transmitted within the total search space. If the DCI format to be scheduled corresponds to the other DCI formats unrelated to the downlink scheduling assignment, at operation 1103, the base station may map the corresponding DCI for transmission to a specific PDCCH candidate in a part of the search space of the control region not used for PDSCH transmission within the total search space.

Figure 12:
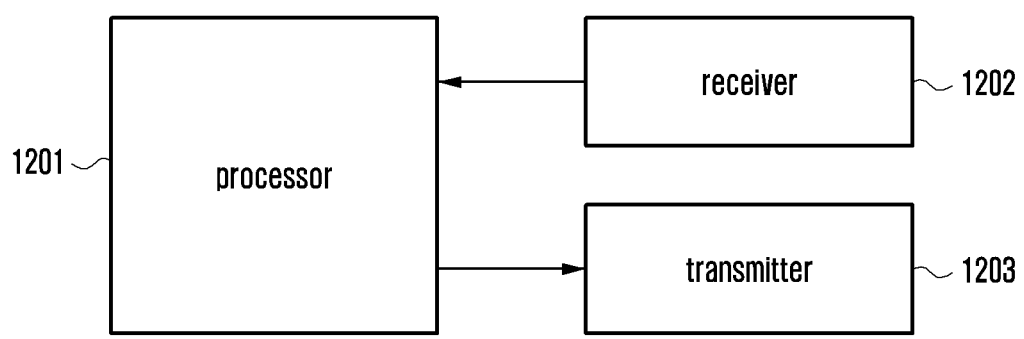
FIG. 12 is a block diagram of a terminal according to an embodiment of the disclosure.
Figure 13:
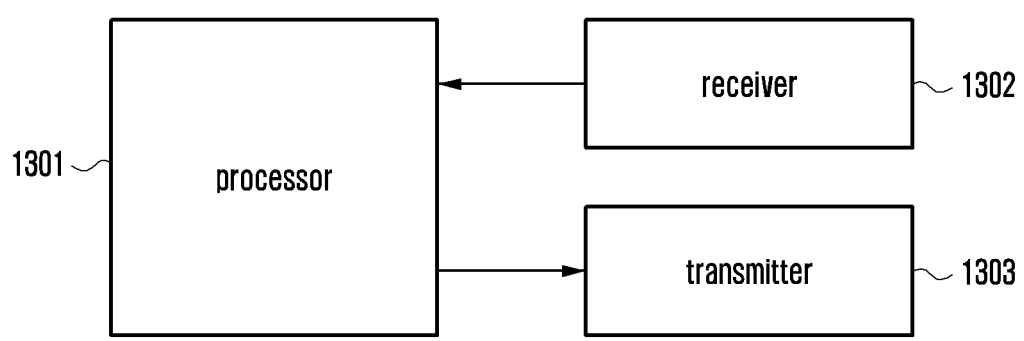
FIG. 13 is a block diagram of a base station according to an embodiment of the disclosure.

To carry out the above embodiments of the disclosure, the terminal and the base station are shown in FIGS. 12 and 13, respectively. Each of the terminal and the base station includes a transmitter, a receiver, and a controller. The base station and the terminal having the above configurations should be able to perform the DCI transmission method, the PDSCH scheduling method, and the blind decoding method for the 5G communication system described as various embodiments.

FIG. 12 is a block diagram of a terminal according to an embodiment of the disclosure.

Referring to FIG. 12, the terminal may include a processor 1201, a receiver 1202, and a transmitter 1203.

The processor 1201 may control the terminal to operate according to the various embodiments of the disclosure described above. For example, the processor 1201 may control blind decoding on the downlink control channel differently according to the various embodiments. The receiver 1202 and the transmitter 1203 may be collectively referred to as a transceiver unit. The transceiver unit can transmit and receive signals to and from the base station. The signal may include control information and data. To this end, the transceiver unit may include an RF transmitter for up-converting the frequency of a signal to be transmitted and amplifying the signal, and an RF receiver for low-noise amplifying a received signal and down-converting the frequency of the received signal. The transceiver unit may receive a signal through a wireless channel and output the signal to the processor 1201, and may transmit a signal output from the processor 1201 through a wireless channel.

FIG. 13 is a block diagram of a base station according to an embodiment of the disclosure.

Referring to FIG. 13, the base station may include a processor 1301, a receiver 1302, and a transmitter 1303.

The processor 1301 may control the base station to operate according to the various embodiments of the disclosure described above. For example, the processor 1301 may control operations differently according to the PDSCH scheduling method and the DCI transmission method of the various embodiments. The processor 1301 can control operations to transmit various additional indicators and configuration information as needed. The receiver 1302 and the transmitter 1303 may be collectively referred to as a transceiver unit. The transceiver unit can transmit and receive signals to and from the corresponding terminal. The signal may include control information and data. To this end, the transceiver unit may include an RF transmitter for up-converting the frequency of a signal to be transmitted and amplifying the signal, and an RF receiver for low-noise amplifying a received signal and down-converting the frequency of the received signal. The transceiver unit may receive a signal through a wireless channel and output the signal to the processor 1301, and may transmit a signal output from the processor 1301 through a wireless channel.

While the disclosure has been shown and described with reference to various embodiments thereof, it will be understood by those skilled in the art that various changes in form and details may be made therein without departing from the spirit and scope of the disclosure as defined in the appended claims and their equivalents.

What is claimed is:

1. A method for a terminal in a wireless communication system, the method comprising:
   receiving, from a base station in the wireless communication system, first downlink control information (DCI) in a search space of the terminal, the first DCI scheduling a downlink data;
   identifying whether the downlink data scheduled by the first DCI is mapped to at least one resource element of a control channel;
   receiving, from the base station, second DCI in a part of the search space of the terminal without the at least one resource element, in case that the downlink data is mapped to the at least one resource element of the control channel; and
   receiving, from the base station, the second DCI in a whole of the search space, in case that the downlink data is not mapped to the at least one resource element of the control channel.

2. The method of claim 1,
   wherein the at least one resource element to which the downlink data is mapped is determined based on an overlap ratio between a first resource region for control information and a second resource region for downlink data, and
   wherein the overlap ratio is given by a ratio between a number of physical downlink control channel (PDCCH) candidates included in the first resource region and a number of PDCCH candidates included in an overlap region of the first resource region and the second resource region.

3. The method of claim 1, wherein, in case that the downlink data is mapped to a resource region in the search space and the first DCI is received in the resource region, the terminal decodes the downlink data on an assumption that a resource element of the resource region on which the first DCI is received is rate-matched.

4. The method of claim 1, wherein the identifying comprises determining based on a starting orthogonal frequency division multiplexing (OFDM) symbol to which the downlink data is mapped.

5. The method of claim 1, wherein the second DCI includes information associated with at least one of an uplink scheduling grant, a power control, a preemption indication, a slot format indication, or a bandwidth part indication.

6. A terminal in a wireless communication system, the terminal comprising:
   a transceiver configured to transmit and receive a signal; and
   a controller coupled with the transceiver and configured to:
      receive, from a base station in the wireless communication system, first downlink control information (DCI) in a search space of the terminal, the first DCI scheduling a downlink data,
      identify whether the downlink data scheduled by the first DCI is mapped to at least one resource element of a control channel, and
      receive, from the base station, second DCI in a part of the search space of the terminal without the at least one resource element, in case that the downlink data is mapped to the at least one resource element of the control channel, and
      receive, from the base station, the second DCI in a whole of the search space, in case that the downlink data is not mapped to the at least one resource element of the control channel.

7. The terminal of claim 6,
   wherein the at least one resource element to which the downlink data is mapped is determined based on an overlap ratio between a first resource region for control information and a second resource region for downlink data, and
   wherein the overlap ratio is given by a ratio between a number of physical downlink control channel (PDCCH) candidates included in the first resource region and a number of PDCCH candidates included in an overlap region of the first resource region and the second resource region.

8. The terminal of claim 6, wherein, in case that the downlink data is mapped to a resource region in the search space and the first DCI is received in the resource region, the terminal decodes the downlink data on an assumption that a resource element of the resource region on which the first DCI is received is rate-matched.

9. The terminal of claim 6, wherein the controller is further configured to identify by determining based on a starting orthogonal frequency division multiplexing (OFDM) symbol to which the downlink data is mapped.

10. The terminal of claim 6, wherein the second DCI includes information associated with at least one of an uplink scheduling grant, a power control, a preemption indication, a slot format indication, or a bandwidth part indication.

11. A method for a base station in a wireless communication system, the method comprising:
    transmitting, to a terminal in the wireless communication system, first downlink control information (DCI) in a search space of the terminal, the first DCI scheduling a downlink data;
    identifying whether the downlink data scheduled by the first DCI is mapped to at least one resource element of a control channel;
    transmitting, to the terminal, second DCI in a part of the search space of the terminal without the at least one resource element, in case that the downlink data is mapped to the at least one resource element of the control channel; and
    transmitting, to the terminal, the second DCI in a whole of the search space, in case that the downlink data is not mapped to the at least one resource element of the control channel.

12. The method of claim 11,
    wherein the at least one resource element to which the downlink data is mapped is determined based on an overlap ratio between a first resource region for control information and a second resource region for downlink data, and
    wherein the overlap ratio is given by a ratio between a number of physical downlink control channel (PDCCH) candidates included in the first resource region and a number of PDCCH candidates included in an overlap region of the first resource region and the second resource region.

13. The method of claim 11, wherein the downlink data is decoded by the terminal on an assumption that a resource element of a resource region on which the first DCI is received is rate-matched, in case that the downlink data is mapped to a resource region in the search space and the first DCI is transmitted in the resource region.

14. The method of claim 11, wherein the identifying comprises determining based on a starting orthogonal frequency division multiplexing (OFDM) symbol to which the downlink data is mapped.

15. The method of claim 11, wherein the second DCI includes information associated with at least one of an uplink scheduling grant, a power control, a preemption indication, a slot format indication, or a bandwidth part indication.

16. A base station in a wireless communication system, the base station comprising:
    a transceiver configured to transmit and receive a signal; and
    a controller coupled with the transceiver and configured to:
        transmit, to a terminal in the wireless communication system, first downlink control information (DCI) in a search space of the terminal, the first DCI scheduling a downlink data,
        identify whether the downlink data scheduled by the first DCI is mapped to at least one resource element of a control channel,
        transmit, to the terminal, second DCI in a part of the search space of the terminal without the at least one resource element, in case that the downlink data is mapped to the at least one resource element of the control channel, and
        transmit, to the terminal, the second DCI in a whole of the search space, in case that the downlink data is not mapped to the at least one resource element of the control channel.

17. The base station of claim 16,
    wherein the at least one resource element to which the downlink data is mapped is determined based on an overlap ratio between a first resource region for control information and a second resource region for downlink data, and
    wherein the overlap ratio is given by a ratio between a number of physical downlink control channel (PDCCH) candidates included in the first resource region and a number of PDCCH candidates included in an overlap region of the first resource region and the second resource region.

18. The base station of claim 16, wherein the downlink data is decoded by the terminal on an assumption that a resource element of a resource region on which the first DCI is received is rate-matched, in case that the downlink data is mapped to a resource region in the search space and the first DCI is transmitted in the resource region.

19. The base station of claim 16, wherein the controller is further configured to identify by determining based on a starting orthogonal frequency division multiplexing (OFDM) symbol to which the downlink data is mapped.

20. The base station of claim 16, wherein the second DCI includes information associated with at least one of an uplink scheduling grant, a power control, a preemption indication, a slot format indication, or a bandwidth part indication.

21. The method of claim 2, wherein, in case that the overlap ratio is less than a threshold, the downlink data is received on the at least one resource element of the control channel, and
    wherein, in case that the overlap ratio is equal to or greater than the threshold, the downlink data is not received on the at least one resource element of the control channel.

22. The terminal of claim 7,
    wherein, in case that the overlap ratio is less than a threshold, the downlink data is received on the at least one resource element of the control channel, and
    wherein, in case that the overlap ratio is equal to or greater than the threshold, the downlink data is not received on the at least one resource element of the control channel.

23. The method of claim 12,
    wherein, in case that the overlap ratio is less than a threshold, the downlink data is transmitted on the at least one resource element of the control channel, and
    wherein, in case that the overlap ratio is equal to or greater than the threshold, the downlink data is not transmitted on the at least one resource element of the control channel.

24. The base station of claim 17,
wherein, in case that the overlap ratio is less than a threshold, the downlink data is transmitted on the at least one resource element of the control channel, and
wherein, in case that the overlap ratio is equal to or greater than the threshold, the downlink data is not transmitted on the at least one resource element of the control channel.

* * * * *